(12) United States Patent
Ungar

(10) Patent No.: US 9,517,806 B2
(45) Date of Patent: Dec. 13, 2016

(54) FOOT-PROPELLED WHEELED HOBBY AND/OR SPORT DEVICE

(71) Applicant: Soma Gabor Ungar, Budapest (HU)

(72) Inventor: Soma Gabor Ungar, Budapest (HU)

( * ) Notice: Subject to any disclaimer, the term of this patent is extended or adjusted under 35 U.S.C. 154(b) by 1 day.

(21) Appl. No.: 14/413,994

(22) PCT Filed: Jul. 8, 2013

(86) PCT No.: PCT/HU2013/000065
§ 371 (c)(1),
(2) Date: Jan. 9, 2015

(87) PCT Pub. No.: WO2014/009760
PCT Pub. Date: Jan. 16, 2014

(65) Prior Publication Data
US 2015/0175233 A1 Jun. 25, 2015

(30) Foreign Application Priority Data

Jul. 11, 2012 (HU) ..................................... 1200416

(51) Int. Cl.
*B62K 1/00* (2006.01)
*B62K 3/00* (2006.01)
(Continued)

(52) U.S. Cl.
CPC ............. *B62K 3/002* (2013.01); *A63C 17/006* (2013.01); *A63C 17/013* (2013.01);
(Continued)

(58) Field of Classification Search
CPC ............. B62L 3/02; B62K 1/00; B62K 3/002; B62K 11/10; B62K 21/08; B62K 23/02; B62C 17/013; B62C 17/016; B62C 17/12; B62C 17/006; B62C 17/0033; B62C 17/08; B62C 17/1427; B62C 17/265; B62C 17/262; B62C 2017/1472; B62C 2203/12; B62C 2203/50; B62H 1/12
See application file for complete search history.

(56) References Cited

U.S. PATENT DOCUMENTS

| 1,585,258 A | * | 5/1926 | Moore | ..................... B62K 1/00 |
| | | | | 280/205 |
| 2,198,857 A | * | 4/1940 | Branson | ................. B62M 29/02 |
| | | | | 280/11.24 |

(Continued)

FOREIGN PATENT DOCUMENTS

| CN | 101746454 A | * | 6/2010 | |
| DE | 3506026 A1 | * | 8/1986 | ............. B62B 13/06 |

(Continued)

OTHER PUBLICATIONS

Gizmag.com "The Magic Wheel: the penny farthing of skateboards?"; Apr. 18, 2008.*

*Primary Examiner* — J. Allen Shriver, II
*Assistant Examiner* — Steve Clemmons
(74) *Attorney, Agent, or Firm* — Olson & Cepuritis, Ltd.

(57) ABSTRACT

The invention is a foot-propelled wheeled hobby and/or sport device which has a central wheel (1), a frame (4) including side plates (20) connected to each other and located on both sides of the central wheel (1) at a distance from it and foot plates (5) on the lower part of the side plates (20) protruding outwards from them, located below the wheel axle (6) which has a wheel hub (2) and, furthermore, a satellite wheel (7), connected to the frame (4), with a diameter smaller than the central wheel (1). The essence of the invention is that from the point of view of the main propelling direction of the device the satellite wheel (7) is located in front of the central wheel (1). The frame (4) has front and rear frame members (21*a*, 21*b*) stiffening the side plates (20), running along their side edges opposite each (Continued)

other. Stable stiffening members are connected at the end parts of the foot plates (5) to the lower ends of the frame members (21a, 21b). The height above the ground of the running surface of the satellite wheel (7) is selected with consideration to the flexibility of the flexibly deformable tyre of the central wheel (1) so that when the wheel tyre (23) is depressed on the effect of the weight of an averagely built person using the device the satellite wheel (7) comes into contact with the ground, so ensuring that the foot plates (5) are horizontal or essentially horizontal.

22 Claims, 12 Drawing Sheets

(51) Int. Cl.
    *A63C 17/01*     (2006.01)
    *A63C 17/12*     (2006.01)
    *B62K 11/10*     (2006.01)
    *B62K 21/08*     (2006.01)
    *B62K 23/02*     (2006.01)
    *B62L 3/02*     (2006.01)
    *A63C 17/00*     (2006.01)
    *A63C 17/08*     (2006.01)
    *A63C 17/14*     (2006.01)
    *A63C 17/26*     (2006.01)

(52) U.S. Cl.
    CPC ............ *A63C 17/016* (2013.01); *A63C 17/12* (2013.01); *B62K 1/00* (2013.01); *B62K 11/10* (2013.01); *B62K 21/08* (2013.01); *B62K 23/02* (2013.01); *B62L 3/02* (2013.01); *A63C 17/0033* (2013.01); *A63C 17/08* (2013.01); *A63C 17/1427* (2013.01); *A63C 17/265* (2013.01); *A63C 2017/1472* (2013.01); *A63C 2203/12* (2013.01); *A63C 2203/50* (2013.01)

(56) References Cited

U.S. PATENT DOCUMENTS

| | | | | |
|---|---|---|---|---|
| 2,971,773 A * | 2/1961 | McKissick | B62K 1/00 188/5 |
| 3,437,351 A * | 4/1969 | St. Clair Newbern | B62K 1/00 280/205 |
| 3,473,623 A * | 10/1969 | De Witt, Jr. | B62B 3/12 180/167 |
| 4,106,786 A * | 8/1978 | Talbott | A63C 17/01 280/205 |
| 4,109,741 A * | 8/1978 | Gabriel | B62M 7/12 180/21 |
| 4,183,546 A * | 1/1980 | Heilig | A63C 17/01 280/11.212 |
| 4,235,448 A * | 11/1980 | Thomas | A63C 17/01 280/842 |
| 4,863,182 A * | 9/1989 | Chern | A63C 17/006 280/266 |
| 4,865,342 A * | 9/1989 | Kong | A63C 17/0033 280/87.042 |
| 5,125,687 A * | 6/1992 | Hwang | A63C 17/0033 188/217 |
| 5,547,204 A * | 8/1996 | Gamzo | A63C 5/031 280/11.19 |
| 6,491,137 B2 * | 12/2002 | Lumpkin | B60T 11/046 188/24.15 |
| 6,926,294 B2 * | 8/2005 | Lewis | A63C 17/0046 280/87.041 |
| 7,147,235 B2 * | 12/2006 | West | A63C 17/013 280/11.19 |
| 7,204,330 B1 * | 4/2007 | Lauren | A63C 17/12 180/181 |
| 7,537,229 B1 * | 5/2009 | Wu | B62H 1/12 280/205 |
| 7,543,834 B2 * | 6/2009 | Goczey | B62K 1/00 280/205 |
| 7,661,682 B2 * | 2/2010 | Jenkins | A63C 17/006 280/11.14 |
| 8,075,006 B2 * | 12/2011 | Smith | A63C 17/0033 280/11.27 |
| 8,079,604 B2 * | 12/2011 | Newton | A63C 17/006 280/11.231 |
| 8,459,667 B2 * | 6/2013 | Ungar | B62K 1/00 280/87.01 |
| 8,523,212 B2 * | 9/2013 | Ryan | B62K 15/008 180/206.1 |
| 8,616,313 B2 * | 12/2013 | Simeray | B62K 1/00 180/181 |
| 8,807,250 B2 * | 8/2014 | Chen | B62K 1/00 180/21 |
| 9,079,096 B2 * | 7/2015 | Chen | A63C 17/0033 |
| 2001/0030404 A1 * | 10/2001 | Liu | A63C 17/0046 280/87.041 |
| 2003/0236150 A1 * | 12/2003 | Huang | A63C 17/0033 482/51 |
| 2005/0230930 A1 * | 10/2005 | Chung | A63C 17/01 280/87.041 |
| 2006/0131830 A1 * | 6/2006 | Berg | B62H 1/12 280/205 |

FOREIGN PATENT DOCUMENTS

| | | | | |
|---|---|---|---|---|
| WO | WO 0240116 A1 * | 5/2002 | ......... A63C 17/0033 |
| WO | WO 2007010127 A2 * | 1/2007 | ............ A63C 17/01 |
| WO | WO 2011082456 A1 * | 7/2011 | ........... A63C 17/004 |
| WO | WO 2012151638 A1 * | 11/2012 | ........... A63C 17/015 |

* cited by examiner

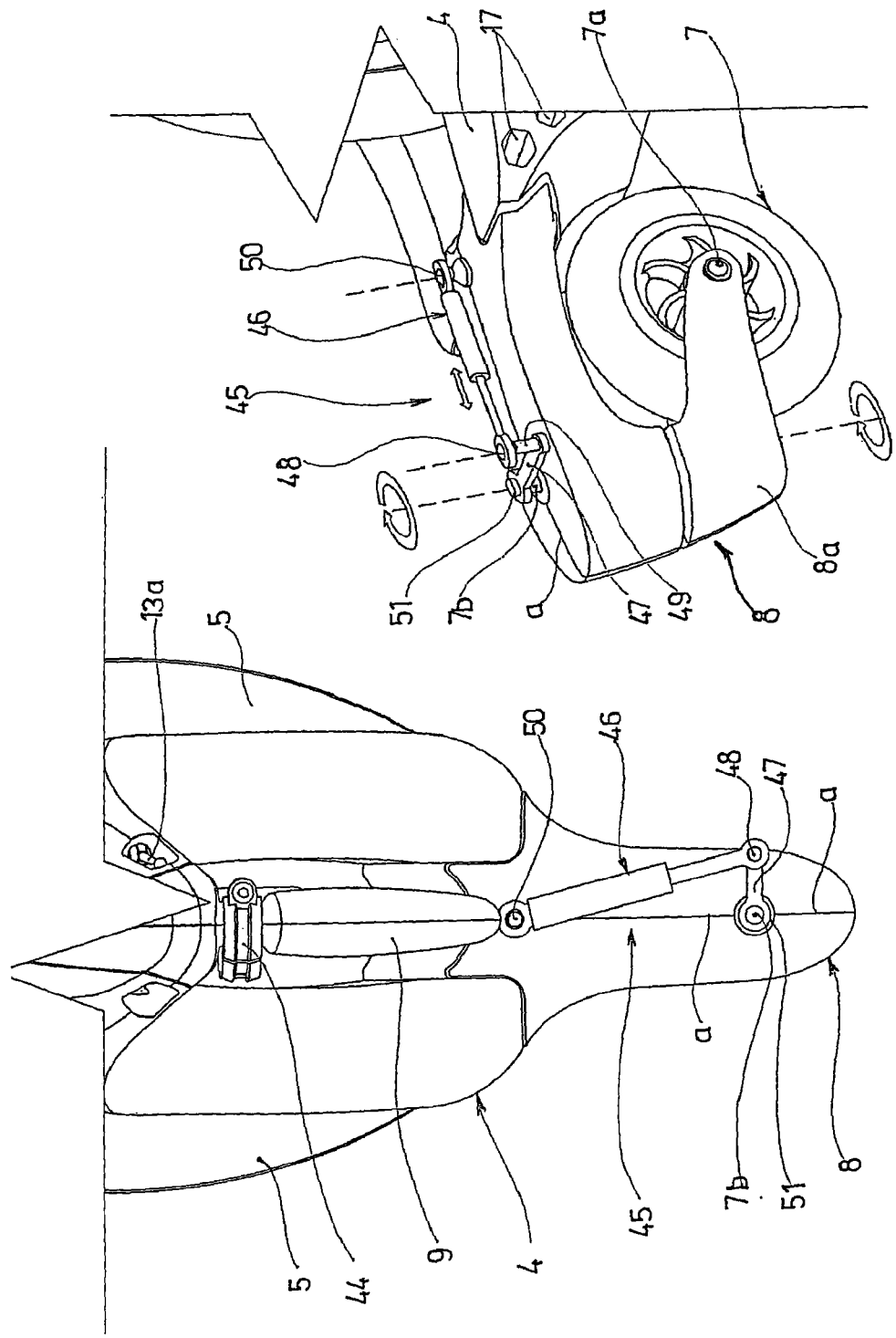

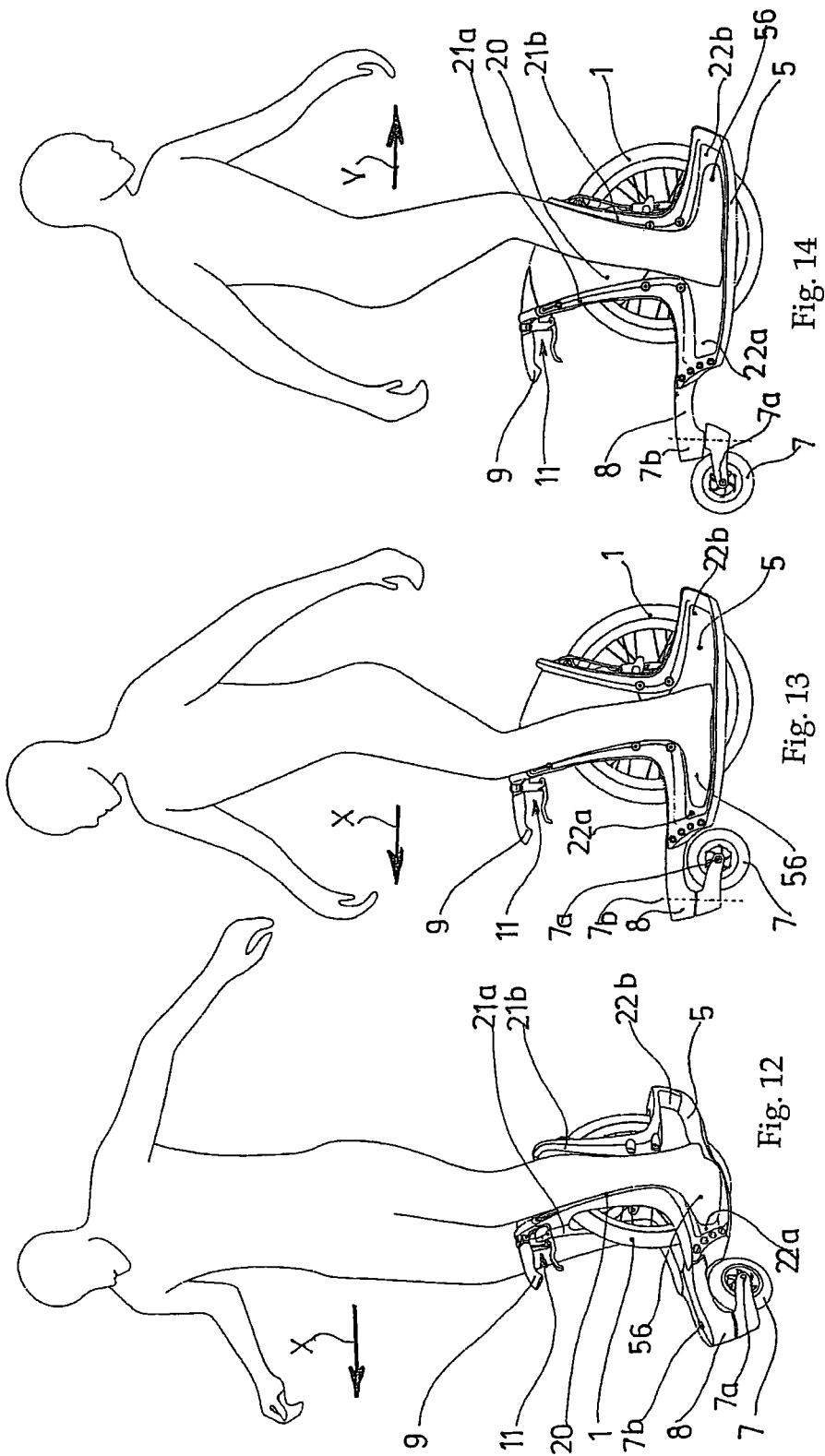

FOOT-PROPELLED WHEELED HOBBY AND/OR SPORT DEVICE

CROSS-REFERENCE TO RELATED APPLICATIONS

This application is a U.S. National Phase of PCT/HU2013/000065, filed Jul. 8, 2013, which claims priority of Hungarian Patent Application No. P 1200416, filed Jul. 11, 2012, each of which is incorporated herein by reference.

The subject of the invention relates to a foot-propelled wheeled hobby and/or sport device without handlebars which has a central wheel, a frame including side plates connected to each other and located on both sides of the central wheel at a distance from it and foot plates on the lower part of the side plates protruding outwards from them, located below the wheel axle which has a wheel hub and, furthermore, a satellite wheel, connected to the frame, with a diameter smaller than the central wheel.

Devices favoured for spending free time involving bodily movement include various foot-propelled structures that roll on wheels, among which the most extensively used is primarily the traditional bicycle on which one sits on a saddle and drives pedals. Besides the relatively complex and large-sized bicycles numerous other, simpler and smaller foot-propelled, wheeled hobby devices are known of that make sporting hobby activities possible, for example roller skates, which are fixed to the user's feet, or the two-wheeled push scooter, which has handlebars, similar to bicycle handlebars, and a long, thin plate to which the wheels are fitted at the front and rear, and its user stands on the plate with one foot, while propelling the scooter with the other. The so-called skateboard is also being used to an increasingly wide extent, which has four, small-diameter wheels and its user stands on it propelling it with movements similar to those used on a scooter, and on sloped surfaces the user stands on the board with both feet and balances with the body while rolling forwards. Finally we also mention that a pedal-propelled sport or hobby device is also known of which has a single spoked wheel like those used on bicycles, the use of which, however, demands such personal—balancing—skills which extremely few people have, therefore it was unable to become a widely spread product, not even in a form stabilised with servomotors, which naturally increase the manufacturing costs to no little extent.

In connection with the aforementioned skateboard we note that—although it is an extremely widely used, popular hobby device—it is extremely slow and not so maneuverable, as the four small-diameter wheels have a very large resistance. Besides this, from the point of view of safety, skateboards may be found objectionable, because if, for example, the user falls or steps off this sport device for other reasons, the device is released and, for example, it may continue to roll on its own on a sloped public road and cause an accident.

A foot-propelled wheeled hobby and/or sport device became known of from international patent application number PCT/HU2003/000043, published on 31 Dec. 2003 under number WO 2004/000635 A1, which has a foot plate and a wheel between two side plates, with the side plates being attached to the axle of the wheel; foot plates positioned under the wheel axle, protruding outwards are connected to the side plates; and the side plates extend above the knee of the person using the device-ensuring a support surface (a) for the knee—and standing on the one or both foot plates while the device is being used according to its function.

This device is of a similar nature to skateboards, i.e. it makes propelling and movement possible that does not demand a handlebar. The person using the device steps up onto the foot plate with one foot and with this loads the device eccentrically, and the user propels the device by kicking off from the ground level with the other foot, then continuously repeating these operations with reversed foot use, i.e. the user travels forwards with repeated stepping up and kicking off changing between the two sides. The interaction between the supported foot of the person using the device loading it eccentrically and the wheel is ensured by the friction force occurring between the knee—partially the lower leg—and the one side plate from the horizontal reaction force of the moment created by the eccentric load force during the alternating support—kicking off operations.

However, although this device is faster and more maneuverable than a skateboard, the risk of swaying forwards or backward appears especially at high travelling speeds achievable through intensive propulsion, which demands an especially great degree of skill from the user. A further problem may be presented by that the support—friction connection—of the lower leg and the knee onto the side plate places a significant demand on the user's knee.

The foot-propelled wheeled hobby and/or sport device forming the subject of international patent application PCT/HU2005/000023 published under number WO 2005/100139 is directed at overcoming these disadvantages, which fundamentally deviated from the former device in that a satellite wheel was built in behind the central wheel from the point of view of the direction of propulsion or travel, with the purpose of making balancing easier and increasing safety. However, even with this measure it was not possible to completely overcome the unnatural balancing behaviour of the device, which obstructs learning for those beginning to use the device; furthermore, even in the case of extensive practice and prolonged use it made it difficult to maintain balance on the device for experienced users. The reason for the unnatural balancing behaviour of the device is that when the frame tilts to the side, the satellite wheel does not naturally steer or direct the device in the direction of tilting. In practice this means that if the user's weight is displaced in one direction (either deliberately in order to start a turn, or accidentally because balance has been lost), the frame tilts in the same direction as the body of the person using the device, however, the satellite wheel positioned at the rear steers the device in the opposite direction. This occurs in this way because the vertical axle of the satellite wheel is in a fixed position as compared to the frame, and in the case of tilting to the right the satellite wheel steers to the left around the vertical axle. In other words if a ski, bicycle, skates or skateboard tilt to the right, they steer to the right, however, contrary to this in the case that the device's frame tilts to the right, the rear satellite wheel steers the device to the left, which makes balancing significantly difficult and unnatural, which cannot be solved merely by the user repositioning his/her bodyweight, precisely because the satellite wheel positioned at the rear steers the device in the direction opposite to the tilt of the frame. The user endeavours to compensate for this undesirable effect by moving, sliding the feet and via the pressure exerted by the knee to the side plate to push—steer—the device in the direction he/she wishes to turn to. As the steering is like this, as the device has to be twisted using the foot and the knee in the direction opposite to where the rear stabilising satellite wheel steers, it demands great skill and serious exertion of force by the user.

In order to maintain balance the user must put his/her foot down sometimes to kick off the ground, e.g. the road surface, because otherwise he/she would fall over. This limits maximum speed to approximately 20 km/h because the user must reduce the speed of the device when he/she puts his/her foot down to kick off the ground. If the device goes faster than 20 km/h the user is no longer able to match the speed of the device with his/her "kick" and if he/she puts his/her foot down this foot will be dragged on the ground, which will reduce stability further instead of restoring stability.

FIG. 5 of WO 2005/100139 relates to an embodiment of the device which also has a satellite wheel with a smaller diameter than the central wheel at the front with respect to the direction of travel, which in the case of normal, i.e. forwards propulsion or travelling does not come into contact with the ground, instead it is positioned a few cm above it. Theoretically this front satellite wheel would only have an active role if the user wishes to propel the device backwards, when the originally rear satellite wheel would rise off the ground and this front wheel would roll at the rear, naturally behind the central wheel, through this causing the same problems deriving from the unnatural balancing behaviour, which we described above in connection with the position of the satellite wheel at the rear. If the front wheel impacts the ground, e.g. the road surface, the foot plates tilt forwards, as a consequence of which the user loses stability.

In the cases of both of the solutions belonging to the state of the art and presented above according to the patent specifications nos WO 2004/000635 and WO 2005/100139 the side plates of the frame of the device, or their side surfaces extend upwards beyond the user's knee. The side plates of the frame provide a form of knee-support surface, and, as an alternative solution, a thigh support. During extensive use of the device it turned out that this steering puts a great strain on the knees, which involves knee-pain, which is caused by that when the user kicks off from the ground with the one foot and stands on the foot plate with the other and his/her knee is pushed up against the side plate due to the moment caused by the force occurring due to the user only standing on just the one side of the frame. While the user is propelling the device, the user bends and straightens each knee when swinging the "pedaling" foot forwards, then kicks off from the ground again and again. As a consequence the skin tissue between the bones of the knee and the side plate is constantly rubbed due to the great pressure, which causes pain.

In both the solutions according to both WO 2004/000635 and WO 2005/100139 the side plates belonging to the frame are formed by thin flat plates—the thickness of these is limited by the requirement that device must be as light as possible and constructible at the lowest possible cost—that are parallel to the central wheel and have very low resistance to bending as opposed to plates or surfaces that are reinforced with ribs. Due to the flat surface and the small plate thickness, the structural rigidity and stability of the side plates of the known solutions against bending is extremely low, as a consequence of which the side plates bend significantly on the effect of the load, when their internal surface may come into contact with the inner surface of the central wheel. The consequence of this is the slowing of the wheel, what is more, an accident may occur if the friction slows down the wheel unexpectedly.

In the interest of improving rigidity there are extruded reinforcing ribs on the sides of the frame in the actually realised version of WO 2005/100139, which increase rigidity, however, the shape and location of these reinforcing ribs limit the usability of the device. These reinforcing ribs on the sides of the frame restrict the position of the feet to one position and direction. This restriction of the position of the feet reduces usability when the user wishes to adjust the position of the feet forwards or backwards in order to distribute weight between the central wheel and the satellite wheel. A further disadvantage of the aforementioned ribs is that the user is unable to stand facing backwards on the foot plates, and is unable to propel the device backwards, only in one direction, forwards. The foot plates are also too short to enable to user to stand facing backwards on the device, because there is insufficient space for the foot to really stand facing backwards.

As a further deficiency of WO 2005/100139 we mention that the lack of a handle or similar limits comfort and usability, when the user is unable to hold the device with his/her hand when he/she wishes to perform a jump or stunt or is unable to comfortably handle or carry the device. Although the device produced and distributed according to WO 2005/100139 does have an oval hole on the side of the frame it make it easier to hold, this is not suitable for carrying out stunts and tricks. The user is only able to hold this by the hand by approaching from a certain angle, therefore, it is difficult to influence the handling of the device with this. A further problem is presented by that if the user does actually hold the device at the oval hole, due to the twisting of the fingers force or moment may be exerted onto the hand, in other words under certain use conditions the oval hole may twist and strain the fingers and the wrist.

There is no presentation of the use of a brake in specification WO 2004/000635, or about the possibility of building in any kind of brake, although in practice—albeit not as an essential supplementary element—the demand for the use of a brake structure did occur. Accordingly, a device was made according to WO 2005/100139 that is fitted with a brake structure; namely the brake is positioned between the central wheel and the rear satellite wheel, and when the user steps on the brake with his/her heel in order to brake, the brake rotates around its pivot and the flexible brake pad is pressed directly up against the ground. The lifetime of this brake mechanism is short; its deceleration ability and efficiency is low; and its behaviour is greatly affected by the texture of the ground, in general the road surface, just like that of brakes that are fitted to the corners of a scooter or heel of a roller skate.

A further deficiency of this brake system is that the controlling of balance takes place via the distribution of the weight between the right and left side foot plates. Nevertheless, the operation of the brake makes it necessary to lift the left foot off the foot plate and press the brake down with the heel. This operation changes the distribution of weight between the left and right sides, which changes the direction of travel of the device. In actual fact when the user brakes, the direction of the device changes and the user loses control over steering. It is not possible to brake the central wheel of this device with, for example, a known bicycle brake system, because the device tilts forwards and it would, through this, lose stability.

Finally, in connection with WO 2005/100139 we refer to that although in the last sentence of the specification there is routine mention of that the device may also be motor powered, the specification gives no concrete instructions in connection with how this is to be realised whatsoever.

The task to be solved with the invention is to provide a foot-propelled wheeled hobby and/or sport device that overcomes or at least minimises the deficiencies of the previously known solutions of this function, which significantly increases stability and makes it easier to steer, to handle and use the device overall, and also makes it safer, beside this it has new functions and makes it possible to perform e.g.

stunts and back jumps and similar, which could not have been performed before, also it has a lower weight than previous such solutions and can be realised at a lower cost.

The invention is based on the following recognitions:

We recognised that if the satellite wheel is positioned in front of the central wheel as regards the propelling/travelling direction of the device, it naturally steers the device, because when the frame tilts in the one direction, the satellite wheel steers the device in this same direction. It take place in this way because if the frame tilts or leans to the right, the satellite wheel swing out to the left around its vertical axle (as in the known devices), nevertheless, as the satellite wheel is positioned in front of (and not behind) the central wheel (e.g. bicycle wheel), it exerts a precise steering effect, which in this case is a good and natural steering effect. This takes place in this way because if the frame tilts to the right, the satellite wheel swings around its vertical steering axle (as in the known devices) to the left, however, as the satellite wheel is positioned in front (and not behind) the central wheel (e.g. bicycle wheel) and exerts a natural steering effect equal to the tilting direction. As a result of this with the device according to the invention the steering may only take place via the repositioning of the centre of gravity of the user, there is no need for the foot or the knee to exert any force for steering, as we wrote above in connection with the known instances of this type of device along with the disadvantages related to this. Steering by merely repositioning the centre of gravity of the body is simpler, easier and safer, and—as we shall see—the device permits a wider range of use while providing greater enjoyment.

We also recognised, furthermore, that it is an optimal arrangement if the height of the satellite wheel positioned in front of the central wheel is determined so that the surface of the foot plates that comes into contact with the feet achieves a horizontal position while both wheels are rolling on the ground. It is advantageous to take into consideration that while under load the tyre of the central wheel with a flexible outer tyre becomes depressed by approx. 1.0 cm, so the height of the satellite wheel is set at a height equal to this distance in the interest of the foot plates taking on a horizontal position while under load.

Furthermore, we recognised that the problems in connection with the demand placed on the knees detailed above may be overcome if the side plates of the frame, or rather its side surfaces do not extend upwards beyond the upper end of the tibia, in other words if the upper ends of the side plates end below the knee joint. It is practical if the side surfaces of the frame are planar, smooth surfaces, in this way they ensure comfortable support for the inner surface of the tibia. The side surfaces may be covered with a foam layer or with a gel material layer, in this way they provide even softer support for the tibia. The advantage of this low-frame geometry is that contrary to the bending and straightening movement of the knee, the tibia takes up a permanent, stable position up against the side of the frame, in other words against the external surface of the side plate of the device, as a result the skin between the inner side of the tibia and the side plate forming the side surface of the frame does not get rubbed, therefore pain does not occur for this reason either.

We recognised furthermore that in the case of the previously known solutions the problems originating from the small thickness of the planar side plates may be overcome and we can achieve an advantageous structural solution from a functional point of view if we stiffen the frame with frame members along the edges of the side plates of the frame at the front and back, and, furthermore, if we attach structural elements to these frame members underneath with such a geometric shape that conforms to the contour of the foot moving forwards and backwards or standing on the foot plate. Due to this the curved form of these structural elements and the spaces with curved surfaces bordered by them do not obstruct the foot taking a position either further forwards or further backwards. A further unique feature of the device established in this way is that the foot plates bordering the aforementioned spaces from underneath provide a satisfactory and reliable support for the foot, whatever the direction the user is standing on them, as the shape of the foot plates widening at the ends follows the shape of the sole of the foot whether the user stands on the device facing forwards or backwards. We note that in this specification "forwards" or "facing forwards" means the direction towards the satellite wheel, therefore we shall be calling this propelling direction in the specification "main propelling direction" or "main travelling direction", and in this sense we define the position of the satellite wheel as being in front of the central wheel. In this sense we also use the expressions "front frame member" and "rear frame member" of the frame, which frame members are favourably hollow and their rigidity may be added to with internal strengthening elements; but the rigidness of the frame members may also be increased by forming an additional planar surface behind the protruding frame members, in this way forming a closed hollow section, which is bordered by the frame member and the planar surface behind it.

The advantage of the geometric structure of the frame members and the element parts connected to them from below is that in addition to increasing the strength and rigidity of the structure it also makes it possible for the user to travel either forwards or even backwards. The user must temporarily change the propelling or travelling direction when arriving at a kerb or other obstacle, because the obstacle can be more easily overcome with the larger central wheel than with the smaller satellite wheel. But swapping between travelling forwards and backwards may also be a part of a trick or balancing stunt as well.

We also recognised that it is advantageous if the device is supplied with a handle which is accessible from the front and protrudes forwards. The advantage of such a handle is that it can be easily grabbed from several directions and the user can lift up and turn the device by holding and manipulating the device by the handle. The user may rotate the device by 180° by placing the palm of the hand at the front end of the handle, by which the user may turn and manipulate the device with his/her hand.

We recognised, furthermore, that if we connect a brake mechanism to the device, even a traditional bicycle brake mechanism known in itself, the advantages of this are the following: increased braking effectiveness, longer lifetime; more predictable braking behaviour. A traditional bicycle brake mechanism may be attached to the device according to the invention because the stabilising satellite wheel is fitted in front of the central wheel, and when the user exerts braking force onto the central wheel, the frontal satellite wheel does not permit the device to tip forwards, in other words the moment created by the braking force exerted on the central wheel is equalled out as a result of the reaction force occurring between the satellite wheel and the ground.

Naturally, not only a traditional bicycle brake structure may be fitted to the device, but any brake structure, for example a brake structure to be developed at a later stage, for which it is obvious that a connection position for this must be established on the device.

We also found it practical to use a handle on the device that is established as a structural component that is separate from the frame, attachable to and detachable from it. Such a handle may be supplied with braces or a brace, which handle may be connected to the frame via releasable connection(s) with the help of fixing element(s) established on the frame. The handle may be supplied with a magazine-like storage compartment where the hydraulic brake pipe may be stored when the handle is attached to the frame. When the handle is separated from the frame, the hydraulic brake pipe is removed from the magazine, and the handle is connected to the frame only via an approximately 1.0-2.0 m flexible brake pipe. The advantage of the detachable handle is that the user does not have to bend over to operate the brake, to reach the handle—which is detached—as the user may hold it in his/her hand, and—like operating a traditional bicycle brake mechanism—the brake lever only has to be pulled in, while the user can freely move his/her arms and balance freely with them. The steering of the device takes place by the user repositioning his/her centre of gravity and by freely moving the arms and hands, and the simultaneous balancing and braking makes many-sided, enjoyable and interesting use of the device possible, which could not be realised with the solutions previously known and discussed. The steering of the device takes place by the user repositioning his/her centre of gravity by balancing with the arms, and a handle that can be held in one hand, which has a brake lever, makes it possible for the user to balance while braking and so steer. This makes the device more versatile and safer as compared to the known such types of device discussed above, in the cases of which simultaneous braking and steering was not possible.

In accordance with the invention the device may be optionally fitted with a battery-operated electric drive system, which is favourably set up as a structural unit separate from the device that may be attached to and detached from it. In other words the device may be perfectly and fully operated merely with human force, without this electric drive system. The frame of the device and the central wheel may be provided with connection points via which the electric drive system may be attached to the device if the user wishes to use it. These connection points—as we shall see—are established, on the one part, on the frame and, on the other part, on the wheel hub of the central wheel. The components of the electric drive structure may be supplied with connection elements that connect to the aforementioned connection points formed on the device, and so the electric drive structure can even be fitted to the device at the factory, or even anywhere and at any time, as the user so requires.

The invention, which in the way defined in claim 1 is a foot-propelled wheeled hobby and/or sport device which has a central wheel, a frame including side plates connected to each other and located on both sides of the central wheel at a distance from it and foot plates on the lower part of the side plates protruding outwards from them, located below the wheel axle which has a wheel hub and, furthermore, a satellite wheel, connected to the frame, with a diameter smaller than the central wheel and the essence of which sport device is that from the point of view of the main propelling direction of the device the satellite wheel is located in front of the central wheel;

the frame has front and rear frame members stiffening the side plates, running along their side edges opposite each other;

stable stiffening members are connected at the end parts of the foot plates (5) to the lower ends of the frame members (21*a*, 21*b*);

the height above the ground of the running surface of the satellite wheel is selected with consideration to the flexibility of the flexibly deformable tyre of the central wheel so that when the wheel tyre is depressed on the effect of the weight of an averagely built person using the device the satellite wheel comes into contact with the ground, so ensuring that the foot plates are horizontal or essentially horizontal.

Advantageous embodiments of the invention are contained in the dependent claims.

In the following we present the invention in detail on the basis of the attached drawings, which contain an advantageous embodiment of the device and a number of structural detail solutions. On the drawings FIG. 1 shows a perspective view of an example of an embodiment of the device;

FIG. 2 shows a side view of the device according to FIG. 1;

FIG. 3*a* at a smaller scale we separately show the device frame with the foot plates in perspective view;

FIG. 3*b* shows a smaller scale side view of the device, illustrating the method how the structure holding the satellite wheel is connected to the frame;

FIG. 4*a* shows the front view of the device according to FIG. 1 viewed from the satellite wheel;

FIG. 4*b* shows the rear view of the device according to FIG. 1;

FIG. 4*c* shows the top view of the device according to FIG. 1;

Figure 5:
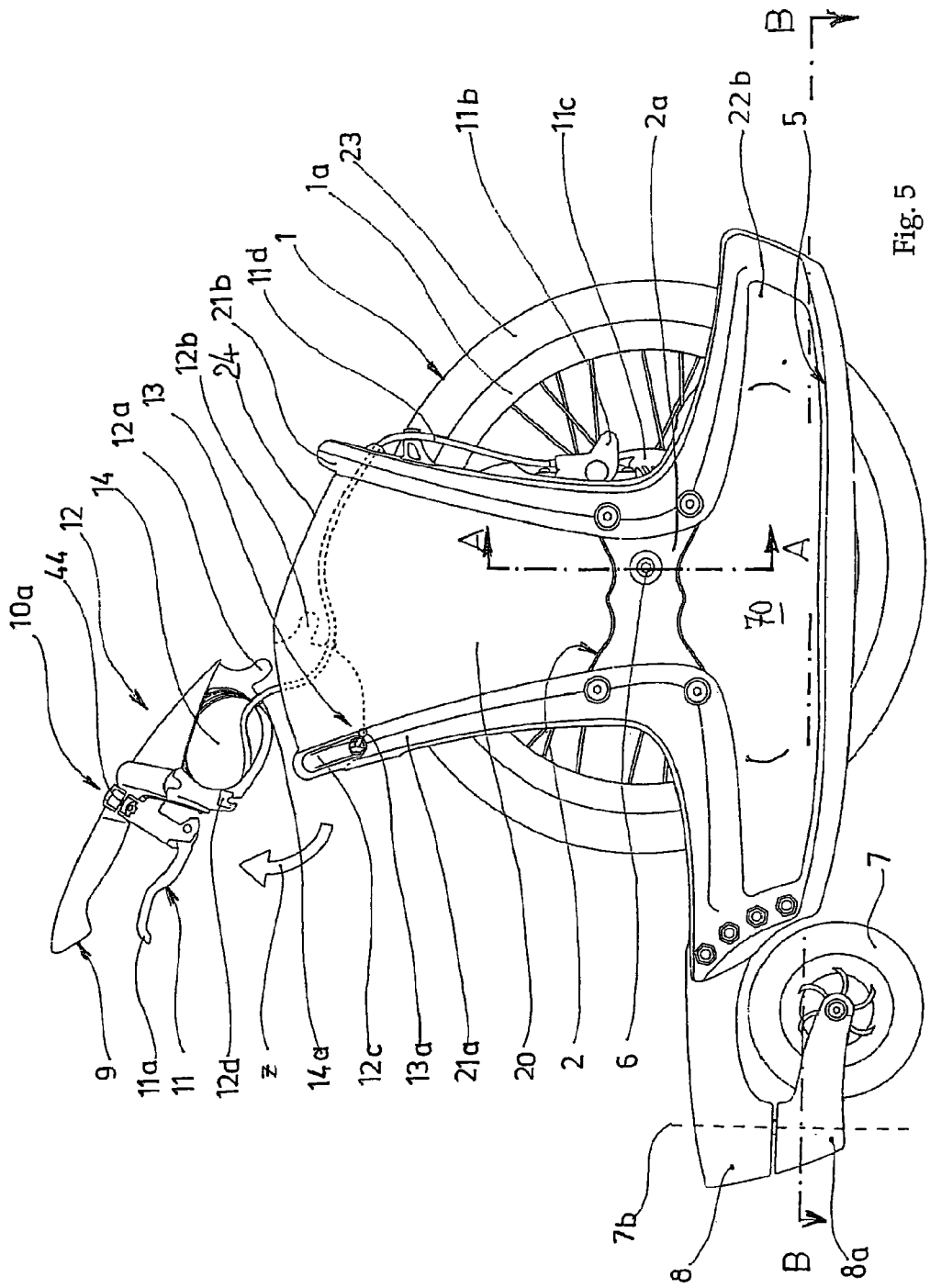
FIG. 5 shows the brake system of the device in side view.
Figure 6:
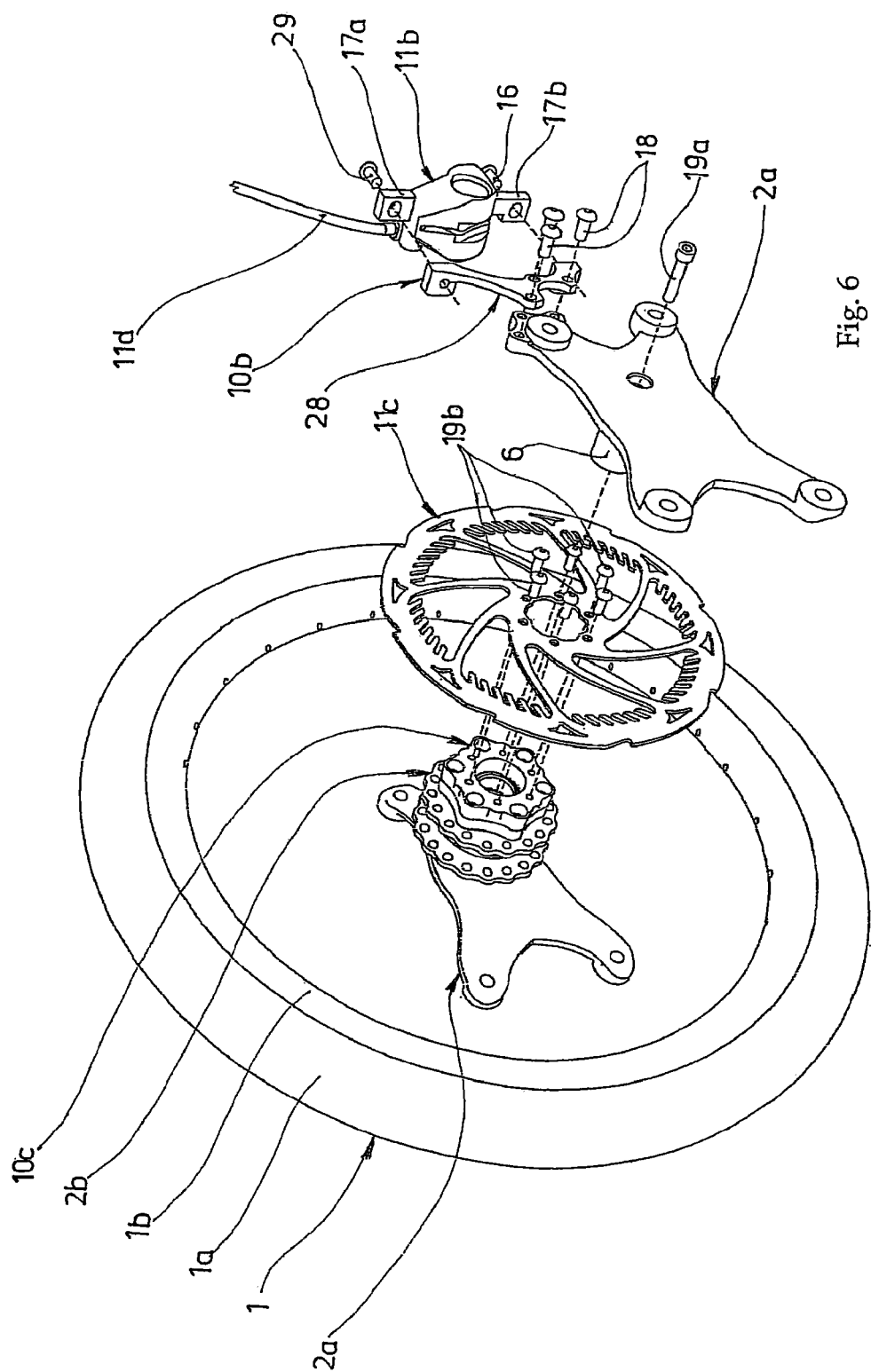
FIG. 6 shows the hub structure of the central wheel of the device according to FIG. 1 and a detail of the brake mechanism in perspective view.
Figure 6B:
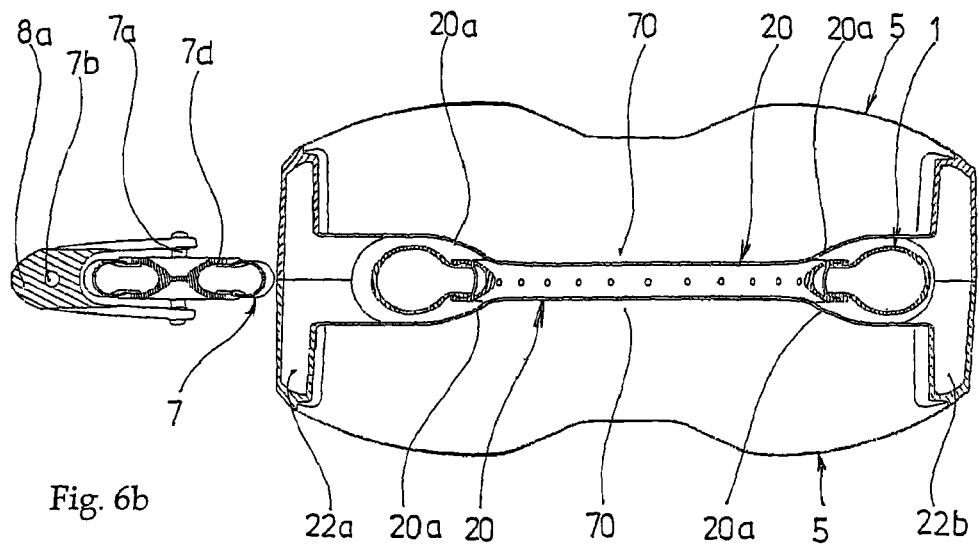
Figure 6A:
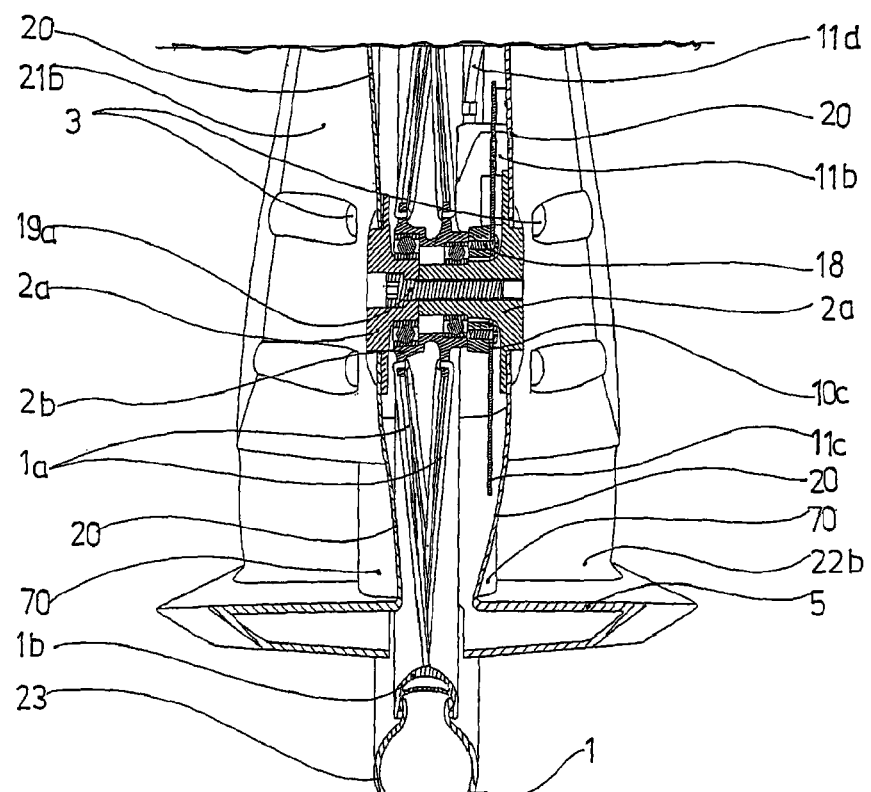
Figure 7:
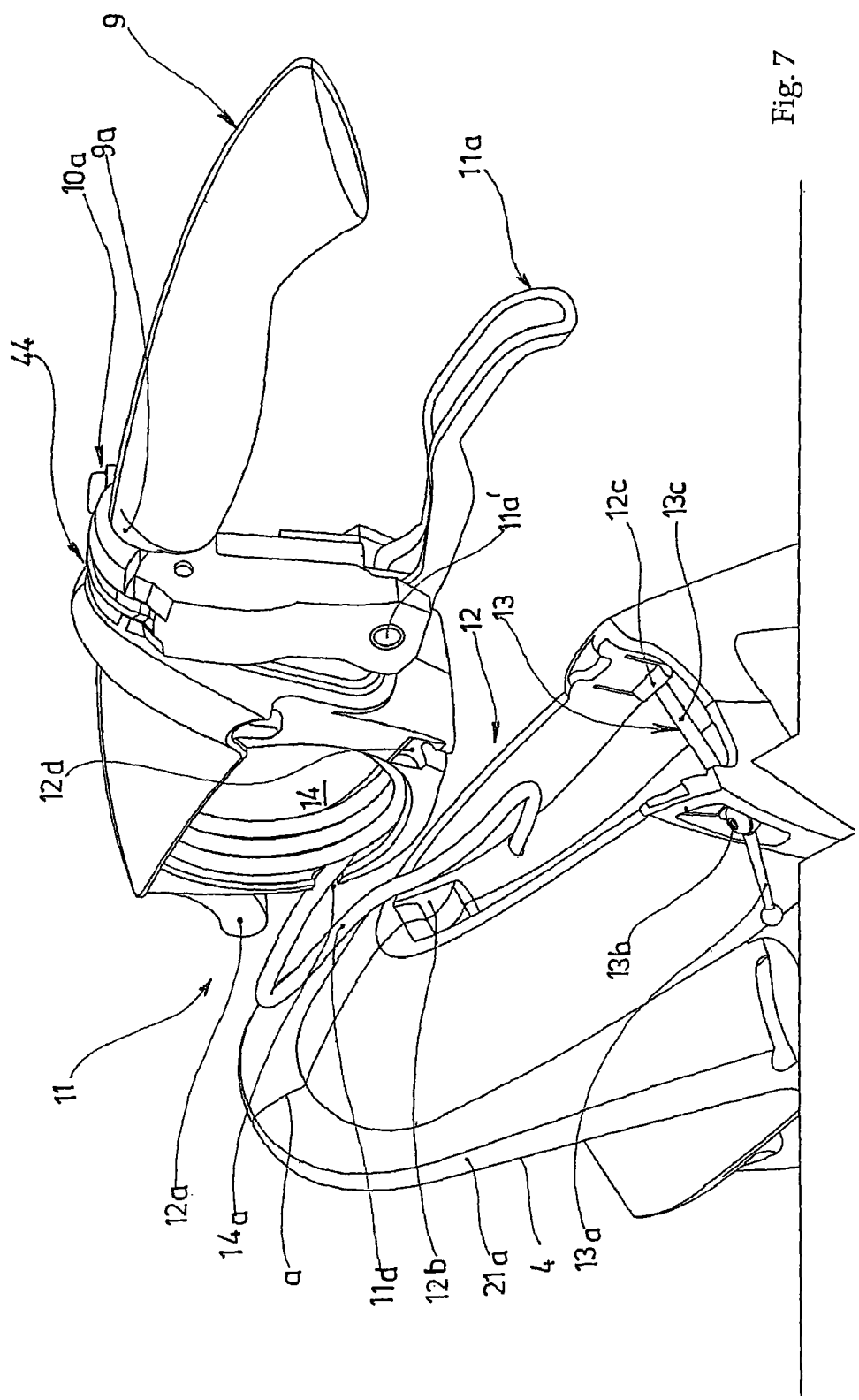
Figures 8, 8A:
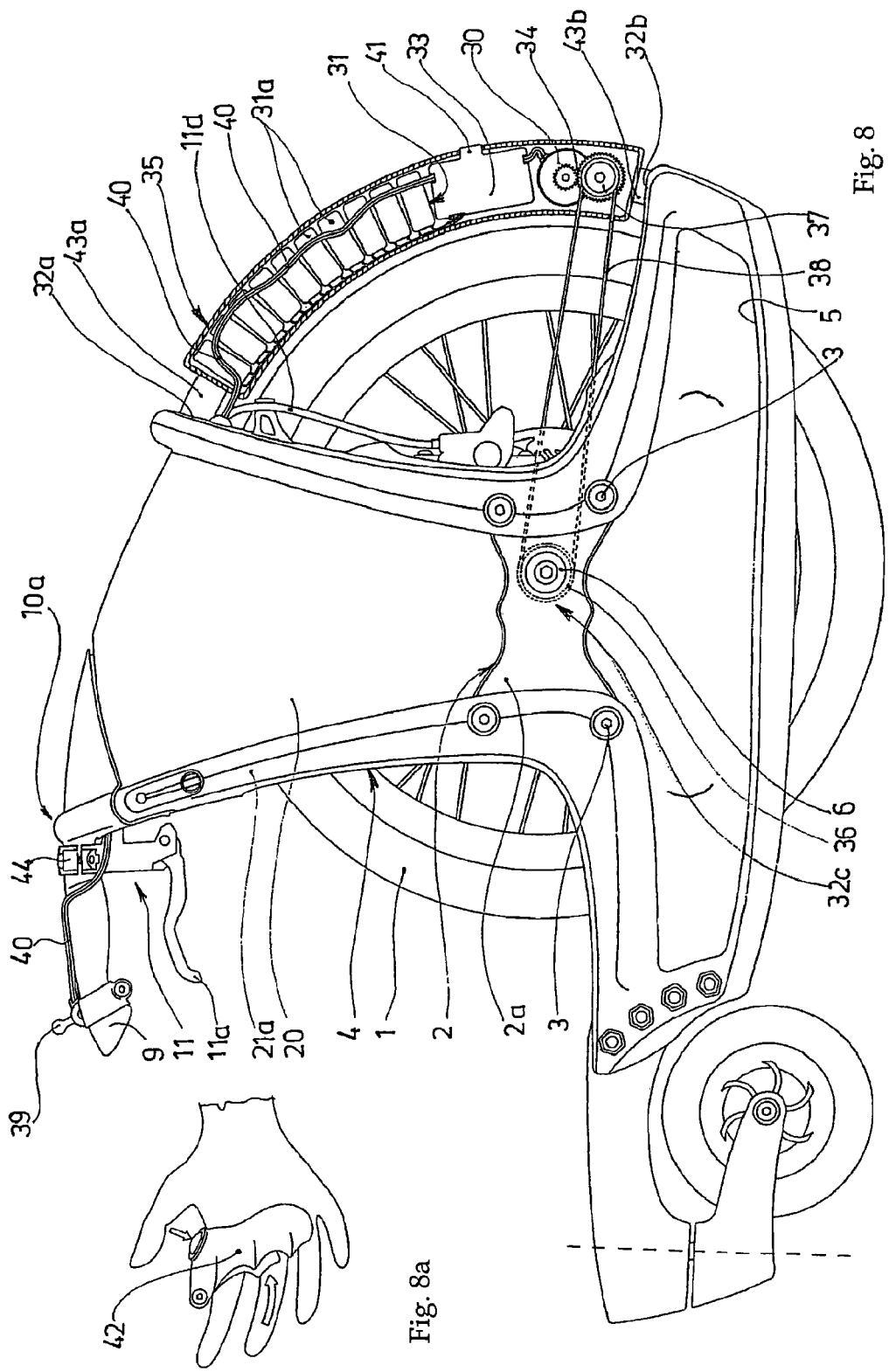
Figure 11:
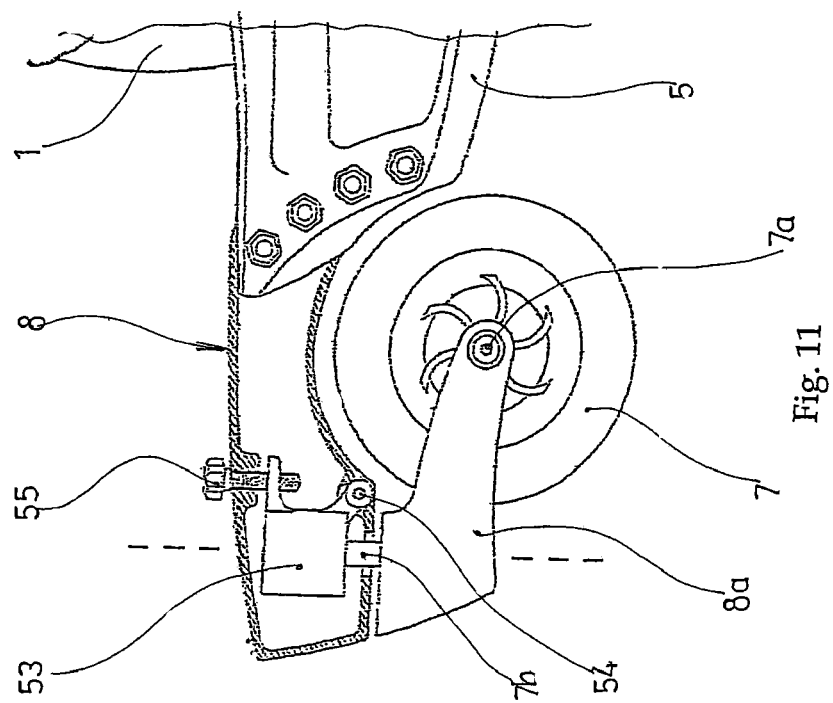
Figure 10:
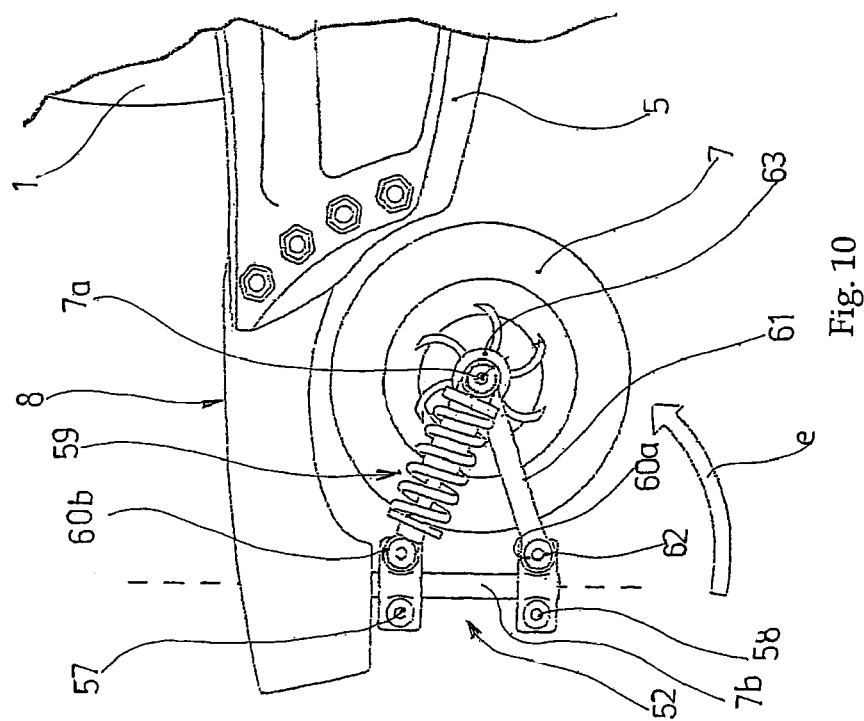

FIG. 6*a* shows the vertical cross-section taken along the A-A lines indicated on FIG. 5;

FIG. 6*b* shows the horizontal cross-section taken along the B-B line indicated on FIG. 5;

FIG. 7 shows the structural solution and the method of the attaching and detaching of the handle and the brake lever to and from the device, in larger scale, in perspective view;

FIG. 8 shows the electric drive system that optionally belongs to the device in side view;

FIG. 8*a* shows a possible method of the control of the motor and an accessory for the control in perspective view;

FIG. 9*a* shows the stabilisation system for the front satellite wheel;

FIG. 9*b* shows the structure according to FIG. 9*a* in perspective view;

FIG. 10 shows an example of the suspension structure of the satellite wheel in side view;

FIG. 11 shows a partial cross-sectional view of the structure ensuring the regulation of the position of the satellite wheel of the device, in other words the structure ensuring the setting of the "head tube angle";

FIG. 12-14 show side views of the various possibilities of the use of the device, namely in FIG. 12 in perspective view and in FIG. 13 in side view we have depicted travelling in the main propelling direction, while in FIG. 14 we have depicted the device travelling backwards, also in side view.

As it can be seen in FIGS. 1-4*c*, the device has a central wheel 1, which, for example, may be a medium sized bicycle wheel, practically about 20 inches in diameter, and it is supplied with, for example, an inflatable, flexible wheel tyre 23 fitted to the rigid wheel rim 1*b* stiffened with spokes 1*a*. We have marked the axis of rotation of the wheel 1 with reference number 6. The wheel 1 has a wheel hub 2, which has side stationary parts 2*a*, positioned between which is the rotating central part 2b. We shall return to a detailed presentation of the wheel hub at a later point.

The device as a whole has a frame 4 indicated with reference number 4, which is separately depicted on FIG. 3a in a smaller scale, which, according to this embodiment, has side plates 20 encompassing the central wheel 1 from both sides, furthermore, according to this embodiment, a curved connection plate 24 running over the top and a front frame member 21a and a rear frame member 21b running along the edges of the side plates 20, linking these and closing them, which are established as hollow, inwardly open, essentially flat U-shaped shell structured plate ribs, the profile of which can be clearly seen in FIGS. 6 and 7.

In this section 63 an opening 64 is formed which is designed for connecting the handle 9, shown on FIGS. 1 and 2 and to be presented in detail at a later point, to the frame 4. As it can be seen on FIG. 3a, a long opening 65 is formed in the upper extension beam part 25d, which serves as the position of the switch lever 13a of the release structure 13—quick-release—also to be presented in detail at a later point.

Figure 1:
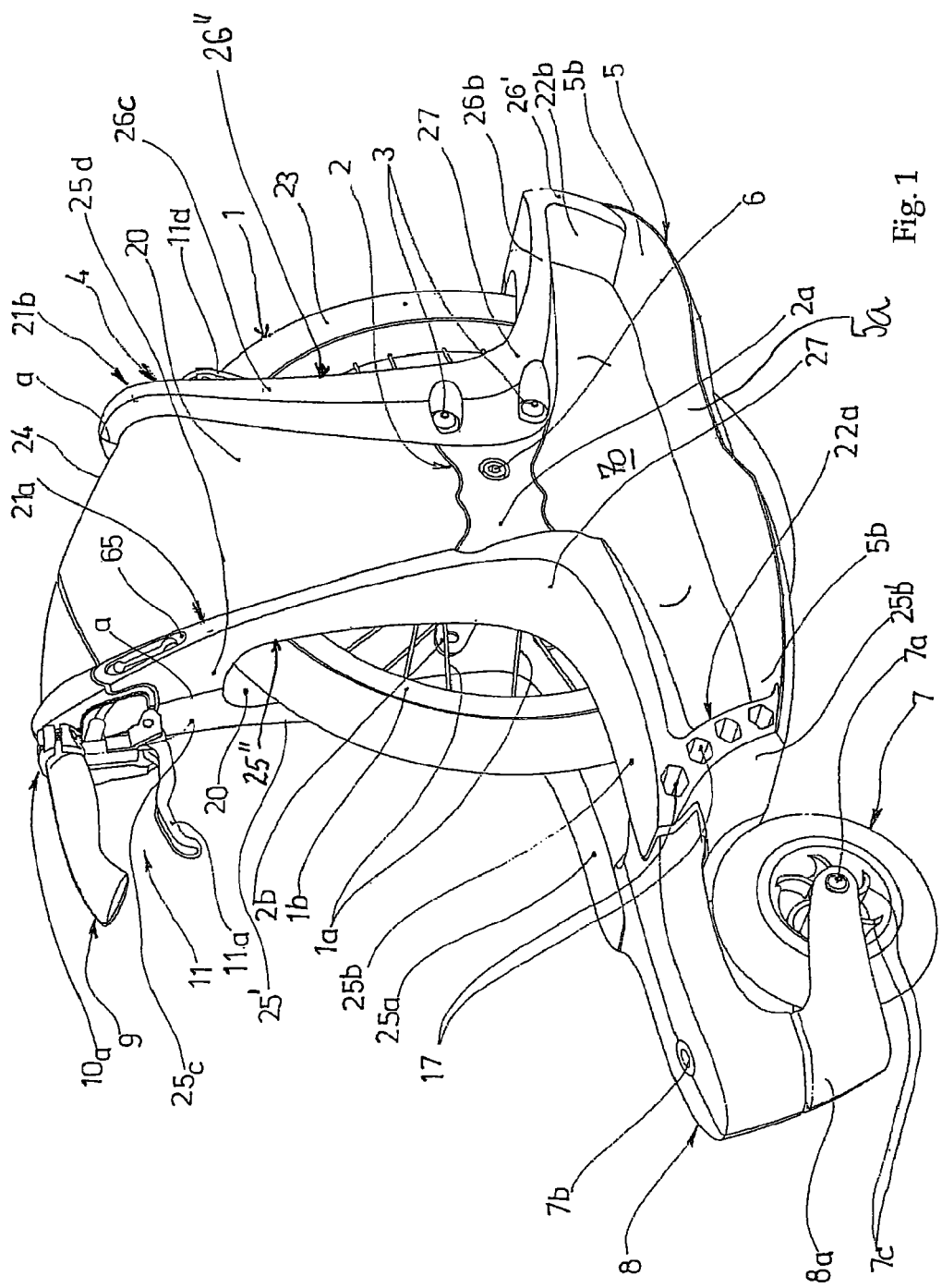
Figure 2:
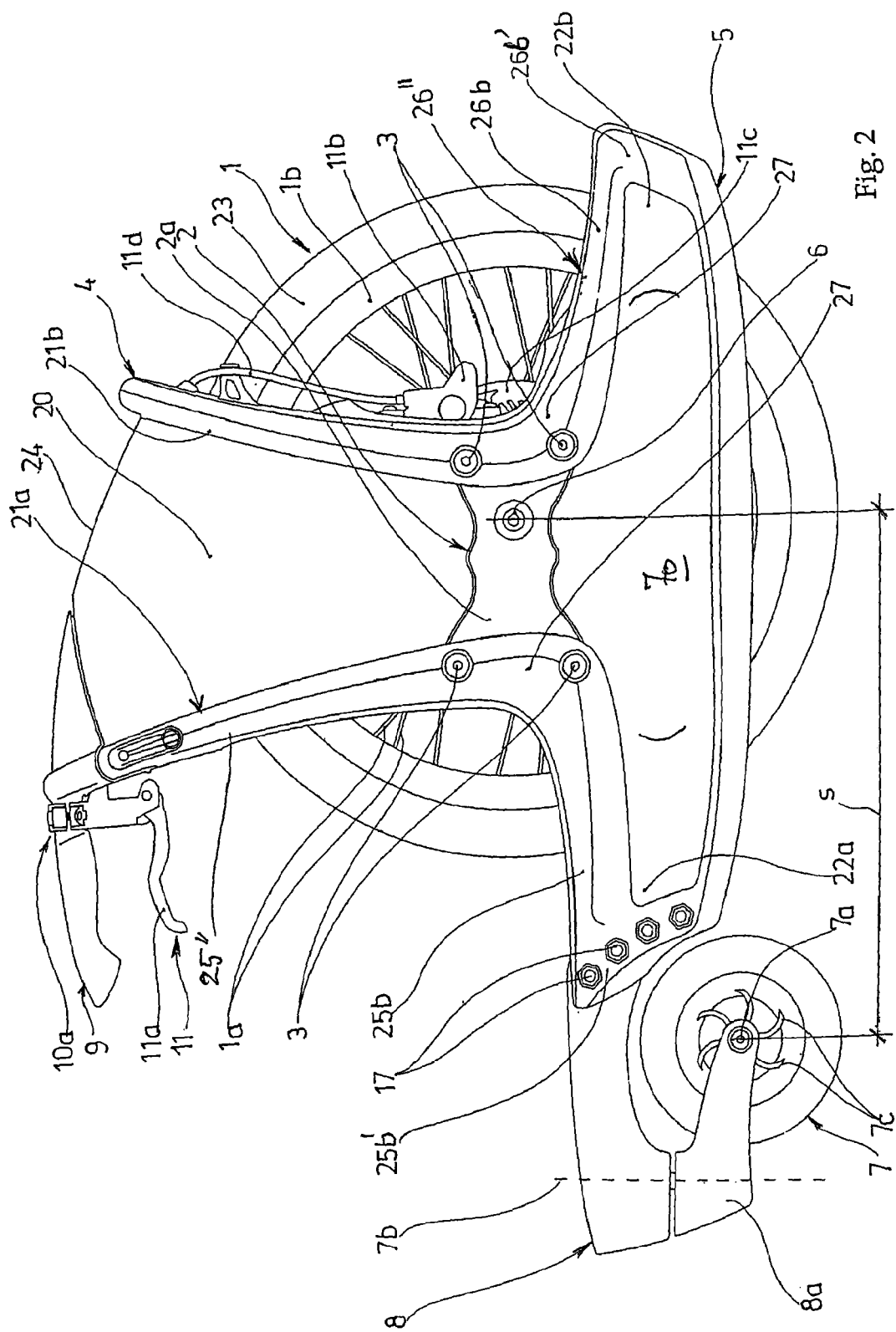

The outer ends of the lower extension beam parts 25a, 25b pass through the reinforcing extension walls 25a', 25b' that extend downwards from them, in which there are holes 66 formed in pairs opposite each other, which holes 66 are perpendicular to the side plates—four pairs of holes 66 according to this example—running through which there are bolts indicated with reference number 17 on FIGS. 1 and 2. These bolts 17 serve to fix the extension part 8, which holds the satellite wheel 7, to the frame 4; see also FIG. 3b to be discussed in detail at a later point On FIG. 3a we have shown the opening 67 serving to accommodate the wheel hub 2 in the side plates 20, as well as the openings 68 which serve to accommodate the fixing bolts 3 indicated on FIGS. 1 and 2. Within the reinforcing extension walls 25a', 25b' there are cavities 22a, also to be presented later, established to conform to the shape of the user's feet.

There are side extension beams 25', 25" with an upside-down U-shape in front view and with an essentially L-shape in side view, the extension beam part extending upwards bends slightly outwards and forwards, which run parallel to each other at a lateral distance f (FIG. 3a) with the central wheel 1 located between them (FIGS. 1 and 2). The lower extension beam part 25a of the side extension beam 25' passes though the upper extension beam part 25c with a curved section 27, in the same way as the lower extension beam part 25b of the side extension beam 25" passes through the upper extension beam part 25d. The upper extension beam parts 25c, 25d pass into each other with the section 63 closing the opening of the central wheel 1.

Figure 3:
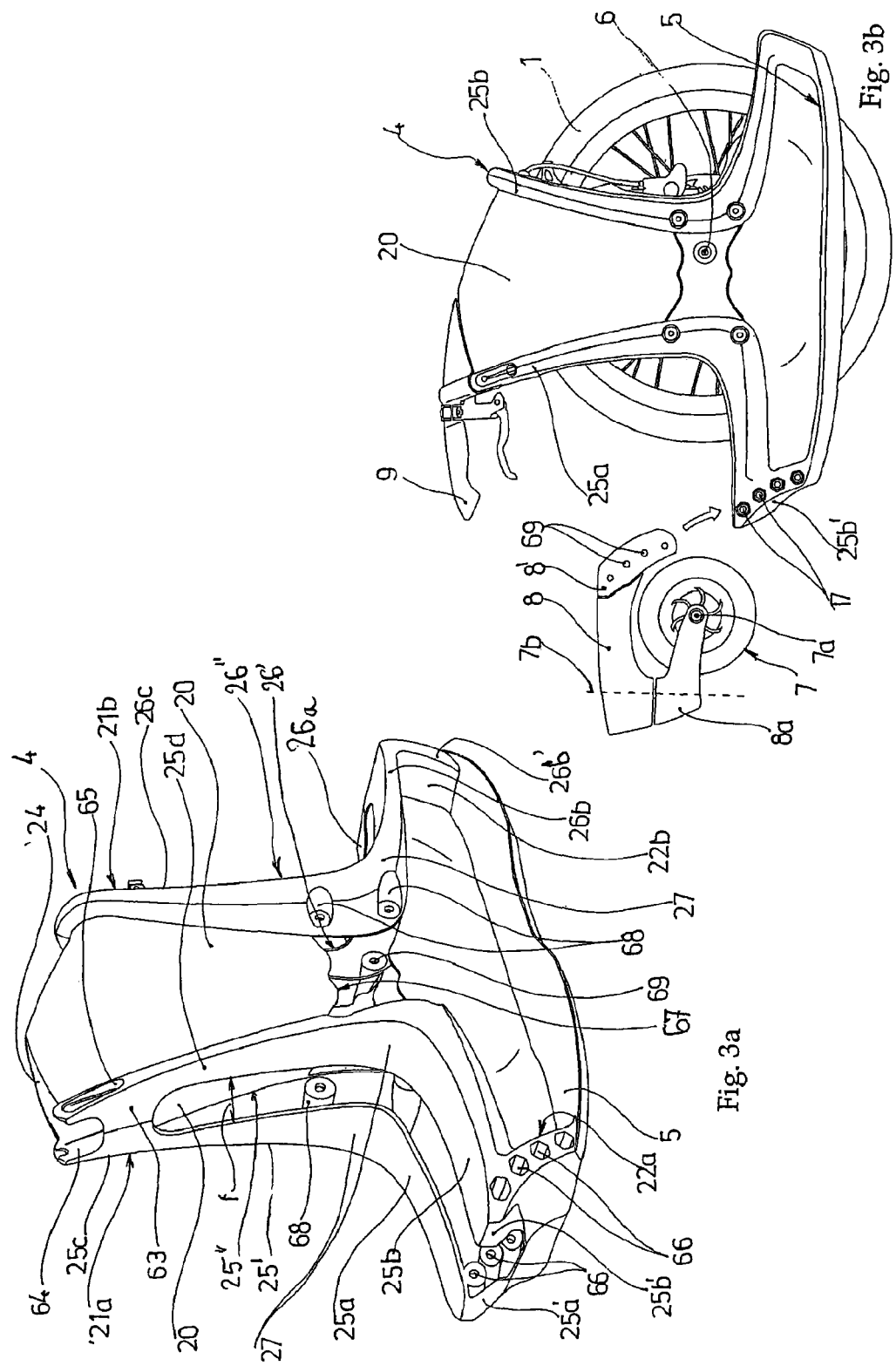
Figure 4:
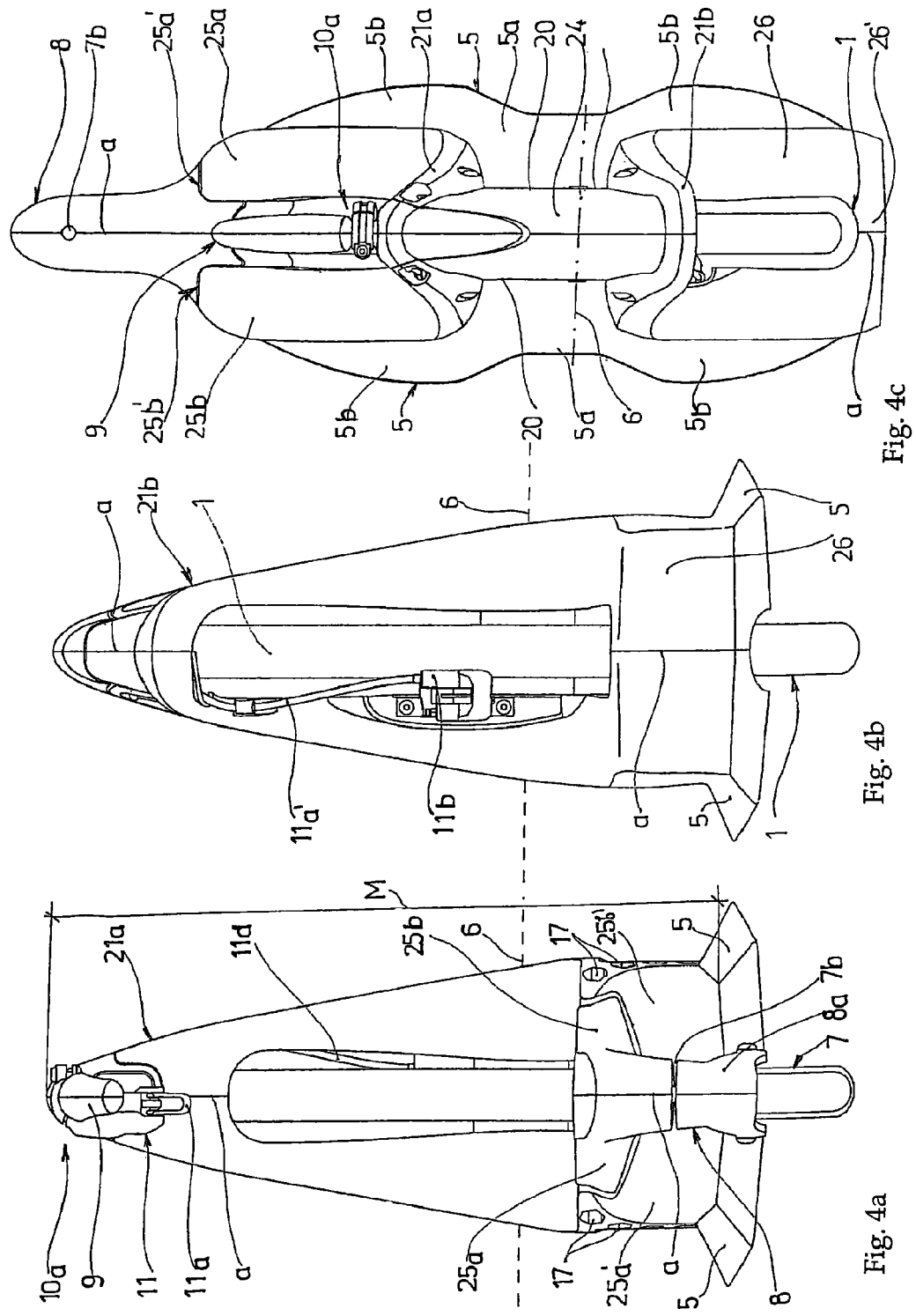

In the way visible on FIGS. 1-3 the rear frame member 21b of the frame 4 has essentially the same structure as the front frame member 21a, in this case also the side extension beams 26', 26" enclosing the central wheel 1 and passing into each other at the top have upside-down U-shaped lower extension beam parts 26a, 26b and upper extension beam parts 26c, 26d, and the outer ends of the former are closed off by continuous reinforcing extension walls 26a', 26b' protruding downwards, which, on the inside, similarly to the aforementioned cavity 22a, along with the foot plates 5 and the inner surface of the lower extension beam 26b delimit the cavity 22b shaped to conform with the foot 56 (FIGS. 12-14). These reinforcing extension walls 25a', 25b' and 26a', 26b' function as elements stiffening the entire frame 4, connecting the associated pairs of lower extension beams 25a, 25b and 26a, 26b, and stably, rigidly suspending the foot plates 5 at their front and rear. We note that the rear, from the point of view of the main propelling direction, cavity 22b does not have to be included in the device by all means, however, its presence makes using the device more versatile.

The frame 4 covering the central wheel 1 from the sides and above is fixed to the side stationary parts 2a of the wheel hub 2 with bolts 3.

We note that from the point of view of production technology it is practical to form the frame 4 and the foot plates 5 in one member from two half-parts symmetrical to each other along the longitudinal central plane of the frame 4, which half-parts are fixed to each other with bolts. The invention, however, is not limited to this concrete embodiment of the frame 4 according to FIGS. 1-3a; for example, it can also be imagined that the frame 4 and the foot plates 5 are formed by bending a tubular frame, and the side plates 20 and the foot plates 5 consist of plates that are fixed to the bent tubular frame with bolts.

In accordance with the invention the device has a satellite wheel 7 positioned at the front with respect to the main propelling direction with spokes 7c and a horizontal axle 7a, the diameter of which is smaller, e.g. 200-100 mm, than the diameter of the central wheel 1, and which is connected to the aforementioned extension arm 8 via the fork-shaped supporting arm 8a. We have indicated the vertical steering axle of the satellite wheel 7 with reference number 7b.

We have depicted the method of the connection of the satellite wheel 7 to the frame 4 with FIG. 3b, on which it can be easily seen that the extension arm 8 along with the inwardly extending arm 8a that is able to rotate around the vertical axle 7b fixed in the extension arm 8 and the satellite wheel 7 rotating around the horizontal axle 7a positioned in the end of the supporting arm 8a may be fitted as a single member into the frame 4 via the nose part 8' of the extension arm 8, namely between the reinforcing extension walls 25a', 25b' indicated in more detail on FIG. 3a, and these may be fixed to the frame 4 with bolts 17 that pass through the holes 66 in these and through the holes 69 in the nose part 8'.

It may be practical to form or assemble the supporting arm 8a so that its height may be adjusted, for example, by pulling out or pushing in the vertical axle 7b. Placing the stabilising satellite wheel 7 at the front results in natural and proper steering in the way detailed previously. The height of the running surface of the satellite wheel 7 above the ground is selected taking into consideration the flexibility of the deformable tyre 23 of the central wheel 1 so that when the tyre 23 is pressed down occurring as a result of the weight of an averagely built person using the device it touches the ground, through this resulting in the foot plates 5 having a horizontal or essentially horizontal position.

The device has a foot plate 5 formed on each side of the device at the bottom, fixed to the frame 4, practically formed as a single member with it, which run under the axle 6 of the wheel 1 practically approximately 3-8 cm above the ground, or the running surface and which essentially run along the entire length of the frame. The foot plates 5 are favourably formed to have a central part 5a with a smaller width and two end parts 5b that widen from the central part 5a via a curved transition, and the central part 5a is positioned below the axle 6 of the wheel 1. As we noted earlier, in the interest of the foot plates 5 always taking up an ideal or optimal position during propelling, it is practical to determine the relationship between the height of the stabilising satellite wheel 7 and the flexibility of the flexible tyre 23 of the central wheel 1 taking into consideration that the flexible tyre 23 may become depressed under the user's weight by 5-10 mm, therefore the height of the satellite wheel 7 above the ground level must be set to this distance in order for the foot plates 5 to be horizontal even when the user is standing on the device. Through this position-setting of the satellite wheel 7 in the case of the normal operation/propelling of the device both the central wheel 1 and the satellite wheel 7 simultaneously roll on the ground, and the surface of the foot plates 5 in contact with the user's feet is horizontal, which results in safe support for the foot.

We note that in order for the weight distribution between the central wheel 1 and the stabilising satellite wheel 7 to be ideal, for it to at least approach the ideal 90%-10% ratio it is practical for the user's foot 56 (FIGS. 12-14), basically the heel to be positioned under the axle of the central wheel 1. Due to this, in the case that the user stands on the device back to front, in other words with his/her back to the satellite wheel 7 and propels the device backwards, which is possible and an option, the user's foot 56 faces backwards, therefore the foot plates 5 must be formed to have at least a length so that the user's foot also fits on the front part on the foot plates 5. Taking this requirement into consideration it is also practical if the foot plates 5 run along the entire length of the device, therefore their length may be nearly, or approaching the same as the diameter of the central wheel 1.

As we have discussed earlier, the height M of the frame a 4 indicated on FIG. 4a, consequentially the slightly lower height of the side plates 20 above the upper plane of the foot plates 5 is selected so that the upper end of these does not extend upwards beyond the upper end of the tibia, through which steering takes place only with the tibia and the user's knees are not subjected to any rubbing whatsoever.

The distance between the central wheel 1 and the satellite wheel 7—we have indicated the distance between the horizontal axles 6, 7a of these wheels on FIG. 2 with reference letter s—results in or influences the distribution of weight between the two wheels; furthermore, it results in the natural radius of steering. In the case that we increase the distance S between the satellite wheel 7 and the central wheel 1 by moving the satellite wheel 7 forwards, or position it at a greater distance, the weight ratio or weight distribution changes in such a way that a smaller amount of weight falls on the satellite wheel 7 and greater weight falls on the central wheel 1. The "natural radius of steering" is the radius of that steering curve that occurs when the device tilts to the one side. If the satellite wheel 7 is placed even further forwards, the natural radius of steering increases, which means that cornering will be less sharp.

As a consequence, placing the satellite wheel 7 further forwards has the advantage of the greater part of the entire weight will fall on the larger central wheel 1, which is advantageous because the rolling resistance of the larger central wheel 1 is lower than that of the smaller satellite wheel 7, so the rolling resistance will drop. The further increase of the natural radius of steering may be advantageous when travelling at higher speed, because the greater natural radius of steering results in greater stability at high speed.

The reduction of the distance between the satellite wheel 7 and the central wheel 1 may be advantageous in the case that if the device is used in a crowded environment, for example, on a pavement, because in this way the total size of the device is smaller, and the smaller natural radius of steering provides the opportunity to the user to travel taking sharper corners and turns, which makes the device easier to handle.

Returning to the foot plates 5 running along both sides of the lower end of the frame 1, especially on FIGS. 1 and 2 it can be easily seen that near to the ends of these there is a cavity 22a, 22b formed on each side, which are open on the side on the outside, and closed underneath, at the back and from above, namely these are bordered by the end parts 5b of the foot plate 5 from underneath, by the lower surfaces of the lower extension beam parts 25a, 25b and 26a, 26b of the frame 4 from above, and by the inner surfaces of the extension walls 25a', 25b', 26'. The shape of these cavities 22a, 22b is selected so that both the front cavity 22a and the rear cavity 22b to comply with the natural shape of the foot 56 with the toes directed forwards. Therefore, when the user propels the device backwards, which in certain cases may be advantageous, the foot is positioned in a natural way in the cavity 22b. Therefore, the cavities 22a, 22b make comfortable propelling possible, and also—as we have discussed previously—and make it possible for the user to change his/her position backwards and forwards and make it possible to perform stunts as well. Otherwise the reinforcing extension walls 25a', 25b' and 26a', 26b' make this frame structurally rigid.

Apart from making the performance of these stunts possible and easier, the brake lever 11a shown on FIGS. 1-4b that may be pulled in the direction of the handle 9 protruding forwards from the upper end of the front frame member 21a and accessible from the front makes braking and the simple manual handling and transportation of the device.

The brake mechanism of the device, the brake lever 11a of which is connected to the device at the connection point 10a, is indicated on FIGS. 1-4c with reference number 11, and has been separately shown in detail on FIGS. 5 and 7, and on these figures we have indicated the structural elements already discussed with the reference numbers already applied. This brake mechanism 11 according to this embodiment is a hydraulic disc brake system used on bicycles and known of in itself. On FIG. 5, on the one hand, it can be easily seen that the handle 9 is connected to the device by a releasable connection, that is it may be detached from and again attached to the frame 4, namely to its frame members 21a, 21b (which we shall present in more detail later on), and, on the other hand, that the connection point 10a of the brake mechanism 11 is on the handle 9, and we have shown the connection structure 12 serving for this on the perspective view of FIG. 7 at a larger. The main parts of the brake mechanism 11 according to FIG. 5—which is otherwise known of in itself—are the already mentioned brake lever 11a, the brake pipe 11d, which transmits the brake fluid, the brake caliper 11b, and the brake disc 11c; we have depicted how these latter two structural parts cooperate with the wheel hub 2 in detail on FIG. 6 at a greater scale—omitting the spokes in the interest of better comprehensibility—where we have indicated the structural elements already presented using the reference numbers already applied. As it can be seen the brake caliper 11b, known of in itself, is connected to the one side stationary part 2a via an arm 28 containing several bores, and the brake caliper 11b is fixed with bolts 29, 16 passing through the tabs 17a, 17b protruding upwards and downwards from the brake caliper 11b, however, this arm 28 is connected to the one stationary part 2a of the wheel hub 2 with bolts 18, which pass through bores formed in the stationary part 2a for this purpose. FIG. 6 well illustrates the method of fixing the brake disc 11c to the rotating central part 2b of the wheel hub 2 with the help of bores formed in it and bolts 19b, which brake disc 11c is located between this rotating central part 2b and the stationary part 2a. The bolt 19a serves for fixing the axle 6. The bolt 19a is in line with the axle 6 and pulls together the right and left side stationary parts 2a; the entire wheel hub 2 can be seen in detail on FIG. 6a.

The releasable connection of the brake mechanism 11—in this case a traditional bicycle brake mechanism—to the device is presented in detail through FIGS. 5 and 7. On FIG. 5 we have shown the upper part of the wound up brake pipe 11d of the brake mechanism 11 in its position protruding from the cavity formed for this purpose in the frame 4, and on FIG. 7 we have depicted the protruding part on a larger scale, detailed perspective drawing.

The connection point 10a of the brake mechanism 11 to the handle 9 is formed on the latter, the handle stem 9a of which has a circular cross-section with a practical diameter of approximately 22 mm and a length of approximately 20 mm, therefore it ensures a secure and appropriate seating for the clamp 44 of the brake lever of a traditional bicycle brake mechanism. The brake caliper 11b—which we have already discussed in connection with FIG. 6—is connected to the one external side stationary part 2a of the wheel hub 2 of the central wheel 1, while the brake disc 11c is connected to the rotating central part 2b of the wheel hub 2 at the connection point 10c.

Characteristic of an advantageous embodiment of the device is that the part of the side plates 20 below the wheel hub 2 and above the foot plates 5 in the region where the user's foot's 56 heel and ankle is positioned when the device is propelled is recessed; the method of the formation of the recess is primarily included in FIGS. 6a and 6b. We note that the hub structure and mechanism explained in detail in connection with FIG. 6 may also be seen in detail in cross-section on FIG. 6b as well.

Returning to the formation of the recesses we note that they are created with the curved bending of the lower section of the side plates 20 near to the wheel; these curved transitional sections have been indicated on FIG. 6b with reference number 20a; between these are the recesses 70, which, in the way visible on FIG. 6a start from about half way along the distance between the wheel hub 2 and the foot plates 5.

As the central wheel 1 is located between the side plates 20, the distance between the latter—and with this the entire width of the device—must always be larger than the width of the wheel 1, so that the wheel 1 fits between the side plates 20. As the spokes 1a meet along the centre line of the wheel rim 1b, at the base of the spokes 1a the wheel 1 is significantly narrower than the total width of the flexible tyre 23 and the wheel rim 1b, and this fact makes it possible to recess the side plates 20 in the direction of the spokes 1a, see FIGS. 6a and 6b. As the spokes 1a meet the wheel hub 2 in a V-shape, the width of the wheel 1 in the vicinity of the wheel hub 2 is again greater, therefore here there is no longer any space for the recess 70, in this region the distance between the side plates 20 must again be appropriately increased.

The dent-like recesses of the frame 4, or rather of the side plates 20 forming a part of it are advantageous because when the user propels the device and is only standing on the one foot plate with one foot, he/she loads the device asymmetrically, which involves the creation of a moment, which forces the upper part of the side plates 20 of the frame 4 from inside, in a lateral direction up to the user's lower leg. The cause of the moment is that the user places a load on the device beside the plane of the central wheel 1. The extent of the moment depends on how far away the user's sole is, especially the distance between the user's heel and the wheel 1. The recess 70 of the side plates 20 instrumented in the way described on the basis of FIGS. 6a and 6b results in that the user's heel becomes closer to the plane of the wheel 1, therefore the lever generating the moment, and so the size of the moment will be smaller, which is advantageous because then the upper part of the side plate 20 places less pressure on the leg.

As a result of the braking performance of the known brake mechanism 11 used for traditional bicycles which is satisfactory for the device according to the invention, its long lifetime, and favourable braking characteristics it is quite satisfactory and therefore it may be combined with the device because the stabilising satellite wheel 7 is connected to the frame 4 in front of the central wheel 1 from the point of view of the main propelling direction, and so when we exert braking force on the central wheel 1 via the wheel hub 2, the front satellite wheel 7 overcomes the risk or possibility of the frame 4 tilting forwards. In other words the moment occurring from the exertion of the brake force on the wheel hub 2 is balanced out as a result of the reaction force that occurs between the stabilising satellite wheel 7 and the ground—road surface.

As it can be seen on FIGS. 5 and 7 the handle 9 that can be separated from and re-fitted to the frame 4—from the curved connection plate 24, which forms a part of the frame 4—is supplied with a connection structure indicated with reference number 12, in other words a fixing mechanism, namely a quick release lock. The connection structure 12 has pin 12a with a rounded surface protruding backwards from the rear part of the handle 9, which fits in the cavity 12b or seat created under the curved connection plate 24a of the frame 4 by being slid in, when the handle 9 along with the brake mechanism 11 fixed to it or without it is positioned fixed under the curved connection plate 24 of the frame 4. There are two locking elements 12c—locking tab pairs—formed on both internal sides of the frame 4, in other words on the opposing internal surfaces of the frame members 21a, 21b, which are in operative connection with the cavities 12d or seats formed on the two sides of the lower part of the handle in such a way that the locking elements 12c made of a flexibly deformable material click into the cavity 12d when the handle 9 is turned downwards until it stops in the direction opposite to that indicated with the arrow z on FIG. 5, and with this we create a rigid but releasable connection between the handle 9 containing the brake mechanism 11 and the frame 4, or rather the curved connection plate 24 belonging to it.

In order to remove the handle 9 from the frame 4 the release structure 13 must be made to operate, the operating arm 13a of which is connected to an axle 13c via a hinge 13b, which axle 13c runs through the aforementioned clicking-in locking elements 12c, 12d. As a result of the turning of the arm 13a the handle 9 may be turned upwards in the direction z indicated on FIG. 5 and may be removed from the frame 4 along with the brake mechanism 11.

The handle 9 that may be removed from the frame 4—as we have already mentioned—has a magazine-like storage compartment 14, in which the upper section of the brake pipe 11d is located when the brake mechanism 11, e.g. according to FIGS. 1 and 2, is connected to the frame 4, and the user uses the brake according to its function. When the handle 9 is released from the frame 4, i.e. it gets into the position according to FIG. 5, then the brake pipe 11d may be removed from the storage compartment 14—which the brake pipe 11d runs from through an aperture 14a—and then the handle 9 is only connected to the frame 4—to its curved connection plate 24—by the approx. 1.0 m upper flexible section of the brake pipe 11d.

The advantage of the removable and re-attachable handle—as we have already mentioned—is that the user does not have to reach down to operate the brake if the handle, along with the brake lever attached to it, is detached from the device, and the user holds the handle in his/her hand. As in this way the user is able to operate the brake by pulling the brake lever 11*a* to the handle 9, while he/she may freely mover his/her arms and freely balance with them. Steering performed by the user repositioning his/her centre of gravity and balancing and simultaneous braking increases the possibilities for the use of the device and makes handling it easier.

We present the battery-operated electric drive system in detail indicated in its entirety with reference number 15, also including an electric motor 30, with reference to FIGS. 8 and 8*a*. Advantageously the electric drive system 15 may be optionally connected, as a separate structural component, to the frame 4, the wheel hub 2 and the handle 9, and, obviously, detached from them, and then reattached to them again. It is obvious that—as we have already mentioned—without the electric drive system 15 the device functions completely and exclusively as a sport device operated with human force.

The electric drive system 15 has a battery pack 31 containing numerous cells 31*a*, which are in connection with the control circuit 33, and this is connected to the motor 30. Via the cogwheel drive unit 34 and with the help of the belt discs 36 and 37 and the drive belt 38 running on them the motor 30 drives the axle 6 of the central wheel 1; in its wheel hub 2 the belt disc 36 is fixed to the rotating central part 2*b*, while the belt disc 37 is fitted to the axle of the motor 30. The motor 30 is in operational connection with the switch 39 fixed to the removable handle 9 via the electric cable 40.

It can be easily seen on FIG. 8 that the motor 30, the battery 31, the drive unit 34 and the control circuit 33, otherwise the control unit, are located in a closed housing 35 behind the central wheel 1, in other words protected from external mechanical effects. The electric cable 40 may be fixed to the hydraulic brake pipe 11*d* and along with this it may be run in and stored in the storage compartment 14, already discussed, of the handle 9 shown on FIGS. 5 and 6. As a result of this when the user of the device removes the handle 9 from the frame 4, both the electric cable 40 connected to the switch 39 and the brake pipe 11*d* come out of the storage compartment 14 and may be removed from the device, in this way the user holds the detached handle 9 in his/her hand and while balancing is able to control the motor 30 via the switch 39 and the cable 40.

For this there are connection points 32*a* and 32*b* on the frame 4, and connection point 32*c* on the rotating part 2*b* of the wheel hub 2 of the central wheel 1. The latter serves to accommodate the belt disc 36—here it is detachably connected to the axle 6—while at the connection points 32*a* and 32*b* there are connection members 43*a*, 43*b* fitted to the electric drive system 15 at the production plant and supplied with it, which may be, for example, bolts, releasable connection elements, etc. for the releasable connection of the electric drive system 15 to the device, which connection may take place already at the production plant, or at any time and anywhere. There may be bores made in the frame 4 in which bolts may be placed to fix the electric drive system 15.

The optional propulsion of the device with a motor may also be imagined by replacing the central part of the wheel hub with a wheel hub motor, which structurally complies with the solution applied in the case of bicycle wheel hub motors. The stationary part 2*a* of the wheel hub 2 may be supplied with soft electromagnets, and the rotating central part 2*b* of the wheel hub 2 may be supplied with hard ferromagnets. The arrangement of the carbon brushes and the winding may take place in the way usual in the case of bicycle wheel hub motors, known in themselves.

An alternative and optional solution may be advantageous if we leave out the hydraulic brake and extend the functionality of the electric drive system to the extent that it is able to function as a brake. The control structure of the electric motor may be set up in such a way that it switches around the polarity of the soft electric magnets and switches the motor into reverse in the case that the user switches the operating switch on the handle to reverse.

As a further advantageous solution, the electric cable may be left out, and the control of the electric motor may take place with an independent, separate, compact drive and brake control structure 42, in other words an operating structure, which fits in the user's hand, which we have shown on FIG. 8*a*, where we have indicated the brake and current control unit, in other words a radio control device with reference number 42. Such a compact drive and brake operation structure may operate the motor 30 with radio signals via the control circuit 33, using the same technology used in the case of motorised models and toys. In the case that the radio signal receiver operating the motor does not receive a signal from the compact radio control device 42, the safety brake operates automatically.

We note that the charging of the battery 31 may take place either by removing the entire housing 35 from the frame 4 and performing this operation in this way, or by connecting the battery 31 and the control circuit 33 to an external electricity supply via a connector 41, and perform the charging in this way.

As we have referred to earlier, and which is well illustrated on FIGS. 9*a* and 9*b*, the extension arm 8 serving to connect the satellite wheel 7 and the frame 4 are favourably produced from two separate parts by plastic injection moulding, and these elements are fixed to one another with bolts 17, practically in the way already detailed according to FIG. 3*b*. The advantage of such a releasable connection arrangement of the extension arm 8 is that it may be removed and replaced with another arm-version, for example, with a version that may be seen on FIGS. 9*a* and 9*b*, and which has a steering stabilising structure 45. The application of such an arm 8 may be imagined that has a pair of wheels, like, for example, the steering unit used for skateboards, known as a "truck".

It can be easily seen on FIG. 9*b*—as well as on FIGS. 1 and 2—that the fork-shaped supporting arm 8*a* connected to the arm 8 in such a way that it may rotate due to the vertical axle 7*b* serves to accommodate the horizontal axle 7*a* of the satellite wheel 7, in other words the vertical axle 7*b* functions as the steering axle of the satellite wheel 7, and rotating, turning around the axle 7*b*, or alternating the steering angle, it rolls along the ground, e.g. road surface, and it is able to freely turn to both lateral directions, at an angle of 360°. The horizontal axle 7*a* passes through the inwardly protruding front end of the supporting arm 8*a* inwardly protruding from the vertical axle 7*b*—steering axle.

The purpose of the steering stabilising structure 45 according to FIGS. 9*a* and 9*b* is to prevent uncontrollable steering oscillations. According to this embodiment the steering stabilising structure 45 has a steering stabilising telescopic hydraulic slave cylinder 46. The rear end of this is connected to the ball joint 50 at the top of the inner end of the arm 8, and its front end is connected to the ball joint 48 at the upper end of the pin 49 protruding upwards from the crank arm 47. The other end of the crank arm 47 is connected with a clamp 51 to the upper end of the vertical axle 7b of the satellite wheel 7, which holds the axle 7b stably. When the axle 7b turns the crank arm 47 also turns with it, and pushes together or pulls apart the telescope parts depending on whether the device is turning right or left. As a consequence of the above arrangement the ball joint 48 is located above the crank arm 47, the advantage of which is that the telescopic slave cylinder 46 stabilising steering does not prevent the satellite wheel 7 from turning 360° around the vertical axle 7b, which, otherwise, in the way easily seen on FIGS. 9a and 9b does not go through the satellite wheel 7 itself, but is positioned in front of it ensuring that the satellite wheel 7 runs after it. It is advantageous to ensure that the satellite wheel 7 can freely turn 360° so that the device may freely change its direction of movement forwards and backwards, see FIG. 14 also. We have illustrated the rotation directions on FIG. 9b with arrows, and the geometric axes of rotation with dashed lines.

It is advantageous if the satellite wheel 7 has a suspension structure 52 visible in side view on FIG. 10, which has clamps 57 and 58 fitting onto the vertical axle 7b. One end of the spring damping member 59 is connected to the upper clamp 57, and the other end is connected to the horizontal axle 7a of the satellite wheel 7. The connection elements 60a and 60b of the spring damping member 59 are hinge-like elements. One end of the pivot arm 61 is connected to the lower clamp 58 and the other end is connected to the horizontal axle 7a, also with the help of hinge-like connection elements 62 and 63.

Under the effect of a load the spring damping member 59 is pushed together, the horizontal axle 7a of the satellite wheel 7 moves upwards along with the rear end of the pivot arm. In other words, the horizontal axle 7a of the satellite wheel 7 is able to rotate around the connection element 60a at the front end of the pivot arm 61, as we have illustrated with arrow e.

An arrangement may be advantageous according to which a spring damping member 59 and a pivot arm 61 is fitted to both the left and right sides, or as an alternative solution such an element pair is fitted to the one side; in the latter case we have a more robust structure that has better compensation features against asymmetric loads.

The advantage of the suspension structure 52 according to FIG. 10, in other words of the satellite wheel 7 suspension is that propelling becomes smoother, which increases comfort and stability. On braking the spring damping member absorbs a part of the momentum, which reduces braking distance.

On FIG. 11 it can be seen that the universal bearing housing 53—known of in itself—of the satellite wheel 7 is connected to the extension arm 8 on its lower side via a hinge 54, also it is suspended from the upper side of the arm 8 with an adjustment screw 55, with the help of which the angle of the bearing housing 53, or in other words of the axle 7b, also known as the "head angle" of the satellite wheel may be adjusted and fixed. The advantage of such a connection of the bearing housing 53 is that this "head angle" of the vertical axle 7b of the satellite wheel 7 may be set to the desired value. Just as in the cases of bicycles and motorcycles, the "head angle" influences steering behaviour and maneuverability, and the regulated or adjustable "head angle" makes it possible for the user of the device to finely adjust the steering behaviour of the device as required.

The use of the device according to the invention takes place by the user placing the device between the legs—more precisely the tibia—and keeps it there in a standing position always while travelling, in the meantime the user stands with one foot on the one foot plate 5 and with the other free foot not supported, the user propels the device like a scooter by kicking away repeatedly from the ground. When the device has accelerated sufficiently, the user places the foot that had been propelling till then onto the relevant footplate 5, and following this exerts force onto the side plates with the tibia steering the free-running device as required, adjusting the centre of gravity, rocking between the right and left leg. We have illustrated this travelling status, in other words when the user is moving forwards with the device in direction X in perspective view on FIG. 12 and in side view on FIG. 13, marking the foot with reference number 56, and obviously using the previously used reference numbers for indicating the same structural elements. On FIG. 14 we show how the user is able to use the device in the reverse direction, in the direction X, using the possibility presented earlier in connection with FIG. 11 that the satellite wheel 7 may be rotated 360° around the vertical axle 7b. On FIGS. 12-14 it is well illustrated how the cavities 22a, 22b conforming to the shape of the foot and discussed in detail previously make the propelling and steering of the device safe.

The advantageous effects linked to the invention are the following:

the device, retaining the favourable characteristics of such devices previously known with a similar function, extends the range of their use, makes steering easier and makes propelling more stable. The frame places less stress on the legs, less than was possible in the case of earlier solutions, as the support surface under the knee is more ergonomic. The lateral force exerted on the leg is also less. The device may be provided with an easy-to-use supplementary brake mechanism that increases comfort and safety, and with an electric motor drive unit, and these accessories may be attached to the device with releasable connections. The stiffening rear and front frame members make the device stronger and safer, furthermore the device becomes usable for extreme sport applications as a consequence of the ergonomic handle and bidirectional foot holders—cavities. The weight and dimensions of the device according to the invention, with respect to the basic solution without the "extras", are less that that of such devices belonging to the state of the art, therefore it is suitable for satisfying a wide range of demands.

The invention claimed is:

1. A foot-propelled wheeled hobby and/ or sport device which has a central wheel (1) having a flexibly deformable tyre (23) and wheel axle (6), a frame (4) including side plates (20) connected to each other and located on both sides of the central wheel (1) at a distance therefrom and foot plates (5) on the lower part of the side plates (20) protruding outwards from the side plates, the foot plates (5) being located below the wheel axle (6) which has a wheel hub (2), and a satellite wheel (7) having a running surface, connected to the frame (4), with a diameter smaller than the central wheel (1), characterised by the satellite wheel (7) being located in front of the central wheel (1) in the main propelling direction of the device;

the frame (4) having a front frame member 21(a) and rear frame member (21b) stiffening the side plates (20), running along their respective side edges opposite each other;

stable stiffening members connected at end parts of the foot plates (5) to lower ends of the frame members (21a, 21b);

height above ground of the running surface of the satellite wheel (7) being based on the flexibility of the flexibly deformable tyre (23) of the central wheel (1) so that when the flexibly deformable tyre (23) is depressed in use the satellite wheel (7) comes into contact with ground, so ensuring that the foot plates (5) are substantially horizontal; and the satellite wheel being a load bearing wheel when the device is travelling in the forward direction in use.

2. Device according to claim 1, characterised by that the weight distribution ratio between the central wheel and the satellite wheel is approximately 90% :10% when in use.

3. Device according to claim 1, characterised by that the front and rear frame members (21a, 21b) are established as hollow, inwardly open, essentially U-shaped shell structured plate ribs; in front view the frame members (21a, 21b) have an upside-down U-shape, and have side extension beams (25', 25"; 26', 26") at a lateral distance (f) from each other; and the side extension beams (25', 25"; 26', 26") have in side view essentially L-shaped lower extension beam parts (25a, 25b; 26a, 26b) and upper extension beam parts (25c, 25d; 26c, 26d) that pass into each other with a curved section (27); and at the external ends of the lower extension beam parts (25a, 25b; 26a, 26b) there are extension walls (25a', 25b', 26a', 26b') established fixed to the ends of the foot plates (5) functioning also as stable stiffening members, and at least within the front, from the point of view of the main direction of propelling the device, extension walls (25a', 25b') there are cavities (22a, 22b) shaped to conform with the shape of the device-user's foot.

4. Device according to claim 1, characterised by that the wheel huh (2) of the central wheel (1) has a rotating central part (2b) and two stationary parts (2a) holding it between them, and the frame (4) is suspended on the stationary parts (2a) via the side plates (20).

5. Device according to claim 1, characterised by that an extension arm (8) protruding forwards from the device is connected to ends of lower extension beam parts (25a, 25b) of the front frame member (21a) of the frame (4), a fork-shaped supporting arm (8a) is provided underneath the arm (8) and fixed to an end part of the arm (8) in an inwardly arranged position such that it is rotatable around a vertical axle (7b) protruding downwards from the end part of the arm (8), the satellite wheel (7) is attached to an inner end part of the supporting arm (8a) with a horizontal axle (7a) positioned under the arm (8).

6. Device according to claim 5, characterised by that the fork-shaped supporting arm (8a) and with this the satellite wheel (7) is fitted to the vertical axle (7b) so that it may be adjusted from the point of view of height.

7. Device according to claim 5, characterised by that the satellite wheel (7) has a suspension structure which has clamps (57, 58) fixed to the vertical axle (7b) at a distance from each other; one end of a spring damping member (59) is attached to the upper clamp (57) with a hinge-like connection element (60b), the other end is connected to the horizontal axle (7a) of the satellite wheel (7) also with a hinge-like connection element (60a); and the lower clamp (58) of the vertical axle (7b) and the horizontal axle (7a) of the satellite wheel (7) are connected to one another via a pivot arm (61) also connected to these with hinge-like connection elements (62, 63).

8. Device according to claim 1, characterised by that it has a steering stabilising structure (45), which has a telescopic damping member, favourably a hydraulic slave cylinder (46), one end of which is connected with a ball joint (50) at the inner end of the extension arm (8), and the other end of which is connected to a ball joint (48) at the upper end of an upwardly protruding pin (49), the lower end of which pin (49) is connected to the one end of a crank arm (47), and the other end of the crank arm (47) is connected to the vertical steering axle (7b) of the satellite wheel (7) via a clamp (51).

9. Device according to claim 1, characterised by having a forward protruding handle (9) releasably connected to the front frame member (21a) of the frame (4)and adapted to operate a brake mechanism (11) and/ or an electric drive system (15).

10. Device according to claim 9, characterised by that the brake mechanism (11) has a brake lever (11a), a brake calliper (11b), brake disc (11c) and brake pipe (11d); and connection positions (10a, 10b, 10c) to the device are on the forward protruding handle (9), the brake calliper (11b), the connection arm (28) bolted onto a side stationary part (2a) of the wheel (2) of the central wheel (1), or on its fixing tab, as well as on a rotating central part (2b) of the wheel hub (2).

11. Device according to claim 10, characterised by that the brake lever (11a) is connected to the handle (9) with a clamp (44), while the brake calliper (11b) is fixed at the connection position (10b) with a bolt (29) at one end of the connection arm (28), and the brake disc (11c) is also fixed to the connection position (10c) and central part (2b) in the wheel hub (2) with bolts (19b).

12. Device according to claim 11, characterised by that the handle (9) has a storage compartment (14) suitable for accommodating at least a part of the brake pipe (11d).

13. Device according to claim 1, characterised by that it has a wheel hub motor.

14. Device according to claim 1, characterised by that the side plates (20) have recesses (70) between the parts under the wheel hub (2) and between the central parts of the foot plates (5).

15. Device according to claim 1, characterised by that the foot plates (5) extend along the entire, or essentially the entire length of the lower part of the frame (4) of the device, and they have favourably widened end parts (5b) at their ends shaped to conform with the user's sole.

16. A foot-propelled wheeled hobby and/or sport device which has a central wheel (1), a frame (4) including side plates (20) connected to each other and located on both sides of the central wheel (1) at a distance from it and foot plates (5) on the lower part of the side plates (20) protruding outwards from them, located below the wheel axle (6) which has a wheel hub (2) and, furthermore, a satellite wheel 7), connected to the frame (4), with a diameter smaller than the central wheel (1), characterized by that from the point of view of the main propelling direction of the device the satellite wheel (7) is located in front of the central wheel (1);

the frame (4) has front and rear frame members (21a, 21b) stiffening the side plates (20), running along their side edges opposite each other;

stable stiffening members are connected at the end parts of the foot plates (5) to the lower ends of the frame members (21a, 21b);

the height above the ground of the running surface of the satellite wheel (7) is selected with consideration to the flexibility of the flexibly deformable tyre of the central wheel(1) so that, when the wheel tyre (23) is depressed using the device, the satellite wheel (7) comes into contact with the ground, so ensuring that the foot plates (5) are horizontal or essentially horizontal;

there is a forward protruding handle (9) connected to the front frame member (21a) of the frame (4) with a releasable connection, which is formed to be suitable for connecting elements aimed at operating a brake mechanism (11) and/or an electric drive system (15); and the handle (9) has a connection structure (12) suitable for releasable fixing to the frame (4), as well as a release structure (13) serving to release the handle (9) from this fixed position; and the connection structure (12) has a pin (12a) protruding from the handle (9)), and a cavity (12b) serving to accommodate this, furthermore it has a cavity pair (12d) made in the handle (9) and a locking element pair (12c) formed in the front frame member (21a) of the frame (4) which can be clicked into the cavity pair (12d); and the release structure (13) has a hinge (13b) arm and an axle (13c) running through the locking element pair (12c) in operating connection with the operating arm (13a).

17. Device according to claim 16, wherein the electric drive system (15) has an electric switch (39) and cable (40) fixed to the handle (9) that may be removed from the frame (4) together with the handle (9), which, via a control circuit (33), are connected to a battery (31) operated motor (30), which is in a drive connection with a rotating central part (2b) of the wheel hub (2) of the central wheel (1) via a drive belt (38) mechanism, in such a way that structural parts of the electric drive system (15) are fixed to other parts of the device so that they may be released and re-attached via connection members (43a, 43b).

18. Device according to claim 17, wherein the battery (31), a part of the electric cable (40), the motor (30), the control circuit (33), as well as a cogwheel drive unit (34) in operation connection with the motor (30) and a belt disc (37) are arranged in a closed housing (35), which is behind the central wheel (1) said housing (35) being connected to the device with releasable connections.

19. Device according to claim 18, characterised by that it has a manual switch (42), a radio control combined brake and current control unit (42).

20. A foot propelled, wheeled device having a central wheel with a flexibly deformable tyre and a relatively smaller satellite wheel in front of the central wheel, and comprising an upstanding frame with opposed side plates and. a foot plate extending outwardly from each side plate;
a forward extension arm mounted to the frame; and
a fork-shaped supporting arm rotatably mounted to the forward extension arm and rotatable about a substantially vertical axis;
the central wheel being rotatably mounted to the frame between the side plates; and
the satellite wheel being rotatably mounted to the fork-shaped supporting arm and rotatable about a substantially horizontal axis; and
the satellite wheel being a load bearing wheel when the device is travelling in the forward direction in use.

21. Device according to claim 20, wherein the weight distribution ratio between the central wheel and the satellite wheel is approximately 90%: 10% when in use.

22. A foot-propelled wheeled hobby and/ or sport device which has a central wheel (1) having a flexibly deformable tyre (23) and wheel axle (6), a frame (4) including side plates (20) connected to each other and located on both sides of the central wheel (1) at a distance therefrom and foot plates (5) on the lower part of the side plates (20) protruding outwards from the side plates, the foot plates (5) being located below the wheel axle (6) which has a wheel hub (2), and a satellite wheel (7) having a running surface, connected to the frame (4), with a diameter smaller than the central wheel (1), characterised by the satellite wheel (7) being located in front of the central wheel (1) in the main propelling direction of the device;
the frame (4) having a front frame member 21(a) and rear frame member (21b) stiffening the side plates (20), running along their respective side edges opposite each other;
stable stiffening members connected at end parts of the foot plates (5) to lower ends of the frame members (21a, 21b);
height above ground of the running surface of the satellite wheel (7) being based on the flexibility of the flexibly deformable tyre (23) of the central wheel (1) so that when the flexibly deformable tyre (23) is depressed in use the satellite wheel (7) comes into contact with ground, so ensuring that the foot plates (5) are substantially horizontal
a forward protruding handle (9) releasably connected to the front frame member (21a) and adapted to operate a brake mechanism (11) and/ or an electric drive system (15);
the handle (9) having a connection structure (12) suitable for releasable fixing to the frame (4), as well as a release structure (13) serving to release the handle (9) from a fixed position; the connection structure (12) having a pin (12a) protruding from the handle (9) and defining a cavity (12b) serving to accommodate the pin (12a); a cavity pair (12d) defined in the handle (9) and a locking element pair (12c) formed in the front frame member (21a) of the frame (4) which can be received into the cavity pair (12d); and the release structure (13) having a hinge (13b) arm and an axle (13c) running through the locking element pair (12c) in operating connection with the operating arm (13a).

* * * * *

UNITED STATES PATENT AND TRADEMARK OFFICE
CERTIFICATE OF CORRECTION

PATENT NO.        : 9,517,806 B2
APPLICATION NO.   : 14/413994
DATED             : December 13, 2016
INVENTOR(S)       : Soma Gabor Ungar It is certified that error appears in the above-identified patent and that said Letters Patent is hereby corrected as shown below:

In the Specification

Column 18,
Line 11, after "direction X" insert -- , --.
Line 17, "direction X" should be -- direction Y --.

In the Claims

Column 19,
Line 30, "huh" should be -- hub --.

Column 20,
Line 15, "wheel (2)" should be -- wheel hub (2) --.
Line 46, "7)" should be -- (7) --.

Column 21,
Line 42, after "and" delete ".".

Signed and Sealed this
Sixth Day of June, 2017

Michelle K. Lee
*Director of the United States Patent and Trademark Office*